United States Patent
Lee et al.

(10) Patent No.: US 7,697,486 B2
(45) Date of Patent: Apr. 13, 2010

(54) TSTD APPARATUS AND METHOD FOR A TDD CDMA MOBILE COMMUNICATION SYSTEM

(75) Inventors: Hyun-Woo Lee, Suwon-shi (KR); Byung-Jae Kwak, Songnam-shi (KR); Sung-Jin Kim, Suwon-shi (KR); Ju-Ho Lee, Suwon-shi (KR); Yong-Suk Lee, Suwon-shi (KR); Jong-Hyeuk Lee, Inchon-Kwangyokshi (KR)

(73) Assignee: Samsung Electronics Co., Ltd (KR)

( * ) Notice: Subject to any disclaimer, the term of this patent is extended or adjusted under 35 U.S.C. 154(b) by 1111 days.

(21) Appl. No.: 11/209,239

(22) Filed: Aug. 23, 2005

(65) Prior Publication Data

US 2006/0013151 A1   Jan. 19, 2006

Related U.S. Application Data

(62) Division of application No. 09/972,814, filed on Oct. 5, 2001.

(30) Foreign Application Priority Data

Oct. 5, 2000 (KR) ............................... 2000-59389
Nov. 9, 2000 (KR) ............................... 2000-67558

(51) Int. Cl.
*H04B 7/216* (2006.01)
(52) U.S. Cl. ....................................... 370/335; 370/280
(58) Field of Classification Search ................ 370/280, 370/335; 375/324, 326, 240
See application file for complete search history.

(56) References Cited

U.S. PATENT DOCUMENTS 5,909,470 A * 6/1999 Barratt et al. ................ 375/324

(Continued)

FOREIGN PATENT DOCUMENTS

CN           1247439 A        3/2000

(Continued)

OTHER PUBLICATIONS $3^{rd}$ Generation Partnership Project (3GPP); Technical Specification Group (TSG); Radio Access Network (RAN), 1.28Mcps Functionality for UTRA TDD Physical Layer, Jul. 2000.

(Continued)

*Primary Examiner*—Dang T Ton
*Assistant Examiner*—Wei Zhao
(74) *Attorney, Agent, or Firm*—The Farrell Law Firm, LLP

(57) ABSTRACT

Disclosed a transmission apparatus in a CDMA mobile communication system. Transmission frames each have a plurality of time slots, and each of the time slots includes two data parts having the same length, a midamble intervening between the data parts, and a guard period for dividing the consecutive time slots. The transmission apparatus modulates the frames into a radio signal with a modulation signal and transmits the modulated radio signal using a plurality of antennas. A power amplifier amplifies the radio signal. A controller generates a switching control signal in a guard period of time slots of a frame associated with the radio signal amplified by the power amplifier. A switch switches the amplified radio signal from the power amplifier between a first and a second antenna in response to the switching control signal.

8 Claims, 24 Drawing Sheets

U.S. PATENT DOCUMENTS

| | | |
|---|---|---|
| 6,002,672 A | 12/1999 | Todd |
| 6,101,176 A | 8/2000 | Honkasalo et al. |
| 6,154,250 A * | 11/2000 | Honey et al. ................ 348/157 |
| 6,330,458 B1 | 12/2001 | Lamoureux et al. |
| 6,577,617 B1 | 6/2003 | Ue et al. |
| 6,766,146 B1 | 7/2004 | Park et al. |
| 2001/0012325 A1 * | 8/2001 | Kobayashi et al. ..... 375/240.26 |

FOREIGN PATENT DOCUMENTS

| | | |
|---|---|---|
| CN | 1248869 A | 3/2000 |
| EP | 0 963 060 A2 | 12/1999 |
| EP | 0 984 646 | 3/2000 |
| EP | 0 986 192 A2 | 3/2000 |
| JP | 07-321547 | 12/1995 |
| JP | 08-195704 | 7/1996 |
| JP | 11-275035 | 10/1999 |
| JP | 2000-013295 | 1/2000 |
| JP | 2000-059274 | 2/2000 |
| KR | 1998-0079946 | 11/1998 |
| KR | 101999008613 | 12/1999 |
| KR | 102000000591 | 1/2000 |
| WO | WO 95/32558 | 11/1995 |
| WO | WO 97/22187 | 6/1997 |
| WO | WO 99/46863 | 9/1999 |
| WO | WO 99/66744 | 12/1999 |
| WO | WO 00/16494 | 3/2000 |

OTHER PUBLICATIONS $3^{rd}$ Generation Partnership Project; Technical Specification Group Radio Access Network; Physical Layer Procedures (TDD), Release 1999, Sep. 2000.

Samsung, "Downlink Tx Diversity Schemes for 1.28Mcps TDD", 3GPP TSG RAN WG1#16, Oct. 10th-13th, 2000.

* cited by examiner

TSTD APPARATUS AND METHOD FOR A TDD CDMA MOBILE COMMUNICATION SYSTEM

PRIORITY

This application is a Divisional application of U.S. application Ser. No. 09/972,814, filed Oct. 5, 2001 which claims priority to an application entitled "TSTD Apparatus and Method for a TDD CDMA Mobile Communication System" filed in the Korean Industrial Property Office on Oct. 5, 2000 and assigned Ser. No. 2000-59389, and an application entitled "TSTD Apparatus and Method for a TDD CDMA Mobile Communication System" filed in the Korean Industrial Property Office on Nov. 9, 2000 and assigned Ser. No. 2000-67558, the contents of both of which are incorporated herein by reference.

BACKGROUND OF THE INVENTION

1. Field of the Invention

The present invention relates generally to a transmission/reception apparatus and method for a TDD (Time Division Duplexing) CDMA (Code Division Multiple Access) mobile communication system, and in particular, to a transmission/reception apparatus and method for transmitting frames in a transmit diversity mode to conquer a time-varying channel characteristic.

2. Description of the Related Art

In general, a TDD CDMA mobile communication system refers to a CDMA mobile communication system in which a plurality of slots constituting one frame are divided into the slots for a downlink channel and the slots for an uplink channel. Meanwhile, the CDMA mobile communication system is classified into the TDD CDMA mobile communication system and an FDD (Frequency Division Multiplexing) CDMA mobile communication system in which a transmission frequency is separated from a reception frequency.

The TDD CDMA mobile communication system is further classified into a W-TDD (Wide band TDD) CDMA mobile communication system and an NB-TDD (Narrow Band TDD) CDMA mobile communication system.

The W-TDD and NB-TDD techniques have been defined by 3GPP ($3^{rd}$ Generation Partnership Project), an ongoing standard for the $3^{rd}$ generation mobile communication. A mobile phone employing the existing TDD digital mobile communication scheme includes a GSM (Global System for Mobile) phone and a CT-2 (Cordless Telephone-$2^{nd}$ generation) phone.

Commonly, performance of the mobile communication system depends on how well the system can operate in a bad mobile communication environment where the channel characteristic is subject to extreme variations. The mobile communication system has used a diversity technique in order to increase transmission/reception efficiency (or throughput) in the bad mobile communication environment. The diversity technique is divided into frequency diversity, time diversity and space diversity.

The frequency diversity is a technique for transmitting the same data with two separate frequencies, and this technique employs interleaving and channel coding. The time diversity is a technique for transmitting the same data twice at regular intervals, and this technique employs a Rake receiver. The Rake receiver, comprised of one searcher and a plurality of fingers, separately receives signals having a different arrival time due to the multiple paths. The space diversity is a technique for transmitting the same data using two antennas being spaced apart.

However, when there are almost no multiple paths or a UE (User Equipment) moves slowly, it is difficult to use the frequency diversity and the time diversity. This is because it is difficult to use the Rake receiver when there are almost no multiple paths.

In this case, therefore, the use of the space diversity is recommended, which corresponds to a transmit (transmission) diversity which can be implemented at the minimum expenses with the minimum modification of the transmission hardware of the Node B (base station transmitter) and the reception hardware of the UE (User Equipment or mobile station).

In addition, there is a time switched transmit diversity (TSTD) technique using one or more antennas. The TSTD is different in principle from the space diversity.

In the TSTD technique, the transmitter alternately uses the two spaced-apart antennas for signal transmission, so that it is possible to increase the capacity of reception channels to the maximum without modifying a structure of the receiver. The TSTD technique can be divided into a closed-loop TSTD technique and an open loop TSTD technique. A space-time transmit diversity (STTD) technique is a typical example of the open loop TSTD technique.

Meanwhile, there is a beam former scheme for improving performance of radio channel. Although it has improved performance, requires a complicated transmission or reception device such as an array antenna. Therefore, it is difficult to apply the beam former scheme to the UE. Further, the beam former scheme, even though used for the Node B, cannot be applied to a common physical channel (CPCH) which is simultaneously transmitted to a plurality of UEs.

Reference will now be made to a transmitter not using the diversity technique in the W-TDD or NB-TDD mobile communication system, and a transmitter using the closed-loop or open loop transmission diversity technique in the W-TDD mobile communication system. In addition, a description will be given of a transmitter using the TSTD technique in the FDD mobile communication system.

FIG. 7 illustrates a structure of a general transmitter not employing a diversity scheme in a Node B for a W-TDD or NB-TDD mobile communication system. Referring to FIG. 7, transmission data is encoded into a coded symbol stream at a predetermined coding rate by a channel encoder 700. The coded symbol stream is interleaved by an interleaver 702, and then, demultiplexed by a demultiplexer 704 into an I channel and a Q channel, creating a pair of complex channels. Among the complex channels, the I channel, a real channel, is spread by a first spreader 706 with an OVSF (Orthogonal Variable Spreading Factor) code, while the Q channel, an imaginary channel, is spread by a second spreader 708 with an OVSF code. The OVSF codes used in the first spreader 706 and the second spreader 708 are identical to each other. The signals on the complex channels I and Q spread with the OVSF code are scrambled with a scrambling code by first and second scramblers 710 and 712, respectively. The scrambled signals are multiplexed with a midamble sequence on a time axis by a time division multiplexer (TDM) 714. Here, output signals of the TDM 714 have a frame structure of the TDD mobile communication system. The I and Q-channel signals output from the TDM 714 are provided to a first multiplier 720 and a second multiplier 722 through a first FIR (Finite Impulse Response) filter 716 and a second FIR filter 718, respectively. The I-channel signal is multiplied by a carrier signal $\cos(\omega_c t)$ by the first multiplier 720, and the Q-channel signal is multiplied by a carrier signal $\sin(\omega_c t)$ by the second multiplier 722, thus outputting modulated radio frequency (RF) signals. The modulated RF signals are added by an adder 724, and then, amplified by a power amplifier (PA) 726 before being transmitted through a single antenna.

However, when the channel environment between the transmitter antenna and the UE becomes worse due to the time-varying mobile communication environment, the receiver of the UE may not decode the received signal.

FIG. 8 illustrates a structure of a common Node B transmitter using the STTD scheme, an open loop TSTD scheme, in a W-TDD mobile communication system. Meanwhile, a technical report for the NB-TDD mobile communication system just mentions possible consideration of the STTD scheme.

Referring to FIG. 8, in the transmitter using the STTD scheme, serial input data is encoded by a channel encoder 800, and then, interleaved by an interleaver 802. The interleaved coded symbols are provided to an STTD encoder 804. The STTD encoder 804 STTD-encodes the interleaved coded symbols and divides the symbols into two separate signals to be transmitted through two different antennas. The two divided signals are provided to a first demultiplexer 806 and a second demultiplexer 828, respectively. The first multiplexer 806 and the second demultiplexer 828 each demultiplex the signals provided from the STTD encoder 804 into an I-channel signal and a Q-channel signal. The I-channel signal demultiplexed by the first demultiplexer 806 is spread with an OVSF code by a first spreader 808, and the Q-channel signal demultiplexed by the first demultiplexer 806 is spread with an OVSF code by a second spreader 809. Further, the I-channel signal demultiplexed by the second demultiplexer 828 is spread with an OVSF code by a third spreader 830 and the Q-channel signal demultiplexed by the second demultiplexer 828 is spread with an OVSF code by a fourth spreader 832. The OVSF codes used by the first to fourth spreaders 808, 809, 830 and 832 are identical to one another. The signal spread by the first spreader 808 is scrambled with a scrambling code by a first scrambler 810, and the signal spread by the second spreader 809 is scrambled with a scrambling code by a second scrambler 812. Further, the signal spread by the third spreader 830 is scrambled with a scrambling code by a third scrambler 834, and the signal spread by the fourth spreader 832 is scrambled with a scrambling code by a fourth scrambler 836. The I-channel signal and the Q-channel signal output from the first scrambler 810 and the second scrambler 812, respectively, are provided to a first TDM 814, and the I-channel signal and the Q-channel signal output from the third scrambler 834 and the fourth scrambler 836, respectively, are provided to a second TDM 838. The first TDM 814 multiplexes the signals from the first and second scramblers 810 and 812 with a first midamble sequence on a time axis according to the channels. The second TDM 838 multiplexes the signals from the third and fourth scramblers 834 and 836 with a second midamble sequence on a time axis according to the channels. The signals output from the first TDM 814 are added by an adder 824 after passing through first and second FIR filters 816 and 818 and first and second multipliers 820 and 822, and then, amplified by a power amplifier (PA) 826 and transmitted through a first antenna ANT1. The signals output from the second TDM 838 are added by an adder 848 after passing through third and fourth FIR filters 840 and 842 and third and fourth multipliers 844 and 846, and then, amplified by a power amplifier (PA) 850 and transmitted through a second antenna ANT2.

The signals transmitted through the first and second antennas ANT1 and ANT2 of the transmitter are received at the UE through two different paths, so that even if only one of the two paths maintains a proper communication environment, the UE can decode the received signal, thus increasing the performance.

It is however undesirable that the transmitter uses two power amplifiers, causing an increase in the cost of the transmitter. When applied to the UE, the STTD scheme not only causes an increase in the cost of the UE, but also impedes miniaturization of the UE. Besides, in order to receive a signal transmitted using the STTD scheme, the receiver requires an additional device for receiving the signal.

FIG. 9 illustrates a structure of a common Node B transmitter using the closed-loop TSTD scheme in a W-TDD mobile communication system.

Referring to FIG. 9, transmission data is encoded by a channel encoder 900, and then, interleaved by an interleaver 902. The interleaved coded symbols are demultiplexed by a demultiplexer 904 into an I channel and a Q channel, creating a pair of complex channels. Among the complex channels, the I channel, a real channel, is spread by a first spreader 906 with an OVSF code, while the Q channel, an imaginary channel, is spread by a second spreader 908 with an OVSF code. The OVSF codes used in the first spreader 906 and the second spreader 908 are identical to each other. The signals on the complex channels I and Q spread with the OVSF code are scrambled with a scrambling code by first and second scramblers 910 and 912, respectively. The scrambled signals are multiplexed with a midamble sequence on a time axis by a time division multiplexer (TDM) 914. The output signals of the TDM 914 are distributed to first and second multipliers 916 and 930 such that the signals should be transmitted through first and second antennas ANT1 and ANT2. The first and second multipliers 916 and 930 multiply the signals output from the TDM 914 by complex weights $\omega_1$ and $\omega_2$, respectively, provided from an uplink channel estimator 944. The complex weights $\omega_1$ and $\omega_2$ are calculated by the uplink channel estimator 944 by calculating feedback signals from the respective UEs. The complex weight $\omega_1$ is multiplied by the signal to be transmitted through the first antenna ANT1, while the complex weight $\omega_2$ is multiplied by the signal to be transmitted through the second antenna ANT2. The I-channel signal and the Q-channel signal multiplied by the complex weight $\omega_1$ by the first multiplier 916 are filtered by first and second FIR filters 918 and 920, respectively, and then, modulated with modulation signals by third and fourth multipliers 922 and 924. The modulated I-channel signal and the modulated Q-channel signal are added by an adder 926, and then, amplified by a first power amplifier 928 before being transmitted through the first antenna ANT1. Further, the I-channel signal and the Q-channel signal multiplied by the complex weight $\omega_2$ by the second multiplier 930 are filtered by third and fourth FIR filters 932 and 934, respectively, and then, modulated with modulation signals by fifth and sixth multipliers 936 and 938. The modulated I-channel signal and the modulated Q-channel signal are added by an adder 940, and then, amplified by a second power amplifier 942 before being transmitted through the second antenna ANT2.

The complex weights $\omega_1$ and $\omega_2$ indicate the channel environments between the respective UEs and the antenna ANT1, or between the respective UEs and the antenna ANT2, and are calculated using the midambles received from the UEs. Actually, since the signals transmitted through the first and second antennas are received at the UEs through the same path and the midamble used to calculate the weights, it is known that the closed-loop TSTD scheme has excellent performance.

However, the closed-loop TSTD scheme also requires two power amplifiers, like the STTD scheme shown in FIG. 8.

FIG. 10 illustrates a structure of a common Node B transmitter using the TSTD scheme in an FDD mobile communication system. The structure shown in FIG. 10 is well disclosed in Korean patent application No. 98-5526, the contents of which are hereby incorporated by reference. In the existing TSTD scheme, the transmitter alternately transmits a transmission signal using two antennas, thereby obtaining a space diversity gain. Therefore, in order to support the TSTD scheme which switches a transmission signal from one antenna to another antenna, the transmission signal should have a switching point, i.e., a guard period (GP) so as to prevent a time delay due to the switching. However, in the FDD mobile communication system, a frequency for downlink transmission is separated from a frequency for uplink transmission, so that no GP exists between frames. Therefore, in order to apply the TSTD scheme to the FDD mobile communication system, a switch should be located before digital-to-analog conversion part. As a result, two power amplifiers are required.

Referring to FIG. 10, transmission data is encoded by a channel encoder 1000, and then, interleaved by an interleaver 1002. The interleaved coded symbols are demultiplexed by a demultiplexer 1004 into an I channel and a Q channel, making a pair of complex channels. Among the complex channels, the I channel, a real channel, is spread by a first spreader 1006 and then scrambled by a first scrambler 1010, while the Q channel, an imaginary channel, is spread by a second spreader 1008 and then scrambled by a second scrambler 1012. The I-channel signal from the first scrambler 1010 and the Q-channel signal from the second scrambler 1012 are provided to a switch. The I-channel signal and the Q-channel signal are digital signals. The switch switches the I-channel signal and the Q-channel signal under the control of a switch controller 1014. The switch controller 1014 controls the switch to alternately switch the I-channel signal and the Q-channel signal to a first antenna ANT1 and a second antenna ANT2 at stated periods. When the I-channel signal and the Q-channel signal are switched to the first antenna ANT1, the I-channel signal and the Q-channel signal are converted to analog signals by first and second FIR filters 1016 and 1018, respectively, and then, modulated with corresponding modulation signals by first and second multipliers 1020 and 1022. The modulated I-channel signal and the modulated Q-channel signal are added by an adder 1024, and then, amplified by a power amplifier 1026 before being transmitted through the first antenna ANT1. Otherwise, if the I-channel signal and the Q-channel signal are switched to the second antenna ANT2, the I-channel signal and the Q-channel signal are converted to analog signals by third and fourth FIR filters 1028 and 1030, respectively, and then, modulated with corresponding modulation signals by third and fourth multipliers 1032 and 1034. The modulated I-channel signal and the modulated Q-channel signal are added by an adder 1036, and then, amplified by a power amplifier 1038 before being transmitted through the second antenna ANT2.

Accordingly, the FDD mobile communication system employing the TSTD scheme also requires a plurality of power amplifiers associated with a plurality of antennas.

SUMMARY OF THE INVENTION

It is, therefore, an object of the present invention to provide a transmit diversity apparatus and method for improving decoding performance of a receiver while preventing an increase in complexity of a transmitter and the receiver by utilizing a feature of a frame structure of a TDD mobile communication system.

It is another object of the present invention to provide a power control apparatus and method for supporting a TSTD scheme in which two antennas alternately use a single power amplifier.

It is further another object of the present invention to provide a transmit diversity apparatus and method for allowing two antennas to alternately use a single power amplifier by estimating a receiving power level using a frame structure of an NB-TDD mobile communication system.

It is yet another object of the present invention to provide a power control method for estimating and controlling a receiving power level on a sub-frame unit basis even when two antennas share a single power amplifier.

It is still another object of the present invention to provide a receiving apparatus and method for receiving a signal transmitted through a single antenna without using an additional power amplifier in a transmission device.

It is still another object of the present invention to provide a transmit diversity apparatus and method applicable to a UE as well as a Node B, for a reduction in size and cost of the UE.

According to a first aspect of the present invention, there is provided a transmission apparatus in a CDMA mobile communication system, wherein transmission frames each have a plurality of time slots, and each of the time slots includes two data parts having the same length, a midamble intervening between the data parts, and a guard period for dividing the consecutive time slots. The transmission apparatus modulates the frames into a radio signal with a modulation signal and transmits the modulated radio signal using a plurality of antennas. The transmission apparatus comprises a power amplifier for amplifying the radio signal; a controller for generating a switching control signal in a guard period of time slots of a frame associated with the radio signal amplified by the power amplifier; and a switch for switching the amplified radio signal from the power amplifier to one antenna of two antennas, and switching the amplified radio signal to another antenna of the two antennas in response to the switching control signal.

According to a second aspect of the present invention, there is provided a transmission apparatus in a CDMA mobile communication system, wherein transmission frames each have two sub-frames, and each of the sub-frames has (i) a plurality of time slots each including two data parts having the same length, a midamble intervening between the data parts, and a first guard period for dividing the consecutive time slots, (ii) a downlink pilot time slot, (iii) a second guard period and (iv) an uplink pilot time slot, intervening between a first time slot and a second time slot among the time slots. The transmission apparatus modulates the sub-frames into a radio signal with a modulation signal and transmits the modulated radio signal using a plurality of antennas. The transmission apparatus comprises a power amplifier for amplifying the radio signal; a controller for generating a switching control signal in a non-transmission period of a sub-frame associated with the radio signal amplified by the power amplifier; and a switch for switching the amplified radio signal from the power amplifier to one antenna of two antennas, and switching the amplified radio signal to another antenna of the two antennas in response to the switching control signal.

According to a third aspect of the present invention, there is provided a power control apparatus in a UE for an NB-TDD CDMA mobile communication system, wherein transmission frames each have two sub-frames, and each of the sub-frames has uplink time slots and downlink time slots, each including two data parts having the same length, a midamble intervening between the data parts. The power control apparatus performs power control by receiving a radio signal having the sub-frame structure through a single antenna. The power control apparatus comprises a plurality of fingers each including, a time demultiplexer for separating a midamble signal from the radio signal having the sub-frame structure; a power measurer for measuring a power level depending on the midamble signal on a sub-frame unit basis and outputting a measured power level; and a power control signaling part for receiving measured power levels output from the fingers, and creating based on the measured power levels a power control command to be transmitted to a Node B over an uplink time slot assigned to itself among uplink time slots of the sub-frame.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

The present invention relates to an improvement in decoding performance of a receiver using diversity in an NB-TDD CDMA mobile communication system. That is, the present invention provides a method for maximally increasing the capacity of reception channels without a modification of a receiver even in a time-varying channel environment, by allowing a transmitter to transmit a signal by alternately using two spaced-apart antennas. The invention allows two antennas to share a single power amplifier by utilizing a frame structure of the NB-TDD mobile communication system. In addition, the technique proposed by the invention is applicable to a W-TDD mobile communication system as well as the NB-TDD mobile communication system.

Since the TSTD scheme proposed by the invention utilizes the frame structure of the W-TDD or NB-TDD mobile communication system, a detailed description will be first made of the frame structure.

Figure 1:
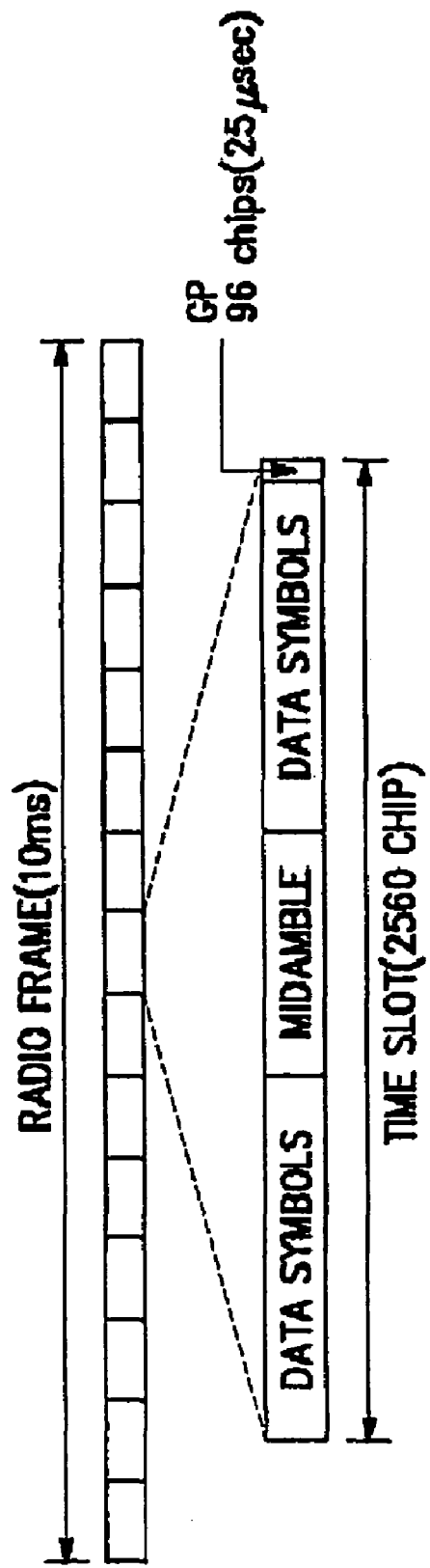
FIG. 1 illustrates a frame structure used in a W-TDD CDMA mobile communication system.

FIG. 1 illustrates a frame structure used in a W-TDD CDMA mobile communication system. Referring to FIG. 1, a frame used in the W-TDD CDMA mobile communication system has a length of 10 ms, and each frame is comprised of 15 time slots. Each time slot is comprised of 2560 chips includes two data parts having the same length, one midamble, and a guard period (GP). The lengths of the data parts and the midamble are divided into two types according to the burst types. In the case of a first burst type, the data parts have a length of 976 chips and the midamble has a length of 512 chips. In the case of a second burst type, the data parts have a length of 1104 chips and the midamble has a length of 256 chips. The GP has a length of 96 chips regardless of the burst types. The respective time slots can be used for either the downlink channels or the uplink channels. That is, only uni-directional transmission of either downlink-transmission or uplink transmission is available in one time slot. Due to such a frame structure, the W-TDD CDMA mobile communication system has a 96-chip non-transmission period GP at the end of every 10 ms frame, and this period has a length of 25 μsec.

Figure 2:
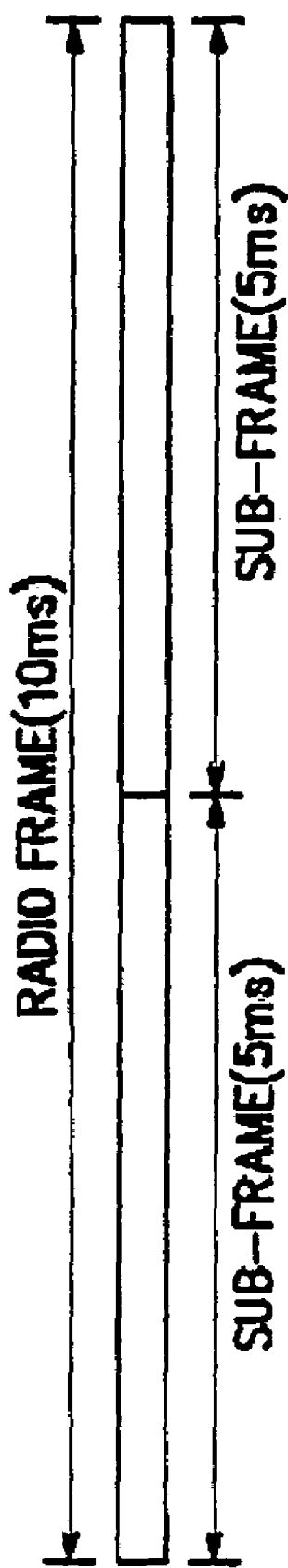
FIG. 2 illustrates a frame structure used in an NB-TDD CDMA mobile communication system.

FIG. 2 illustrates a frame structure used in an NB-TDD CDMA mobile communication system. Referring to FIG. 2, a frame for the NB-TDD CDMA mobile communication has a length of 10 ms, and each frame is divided into two sub-frames. The two sub-frames in each frame have the same structure.

Figure 3:
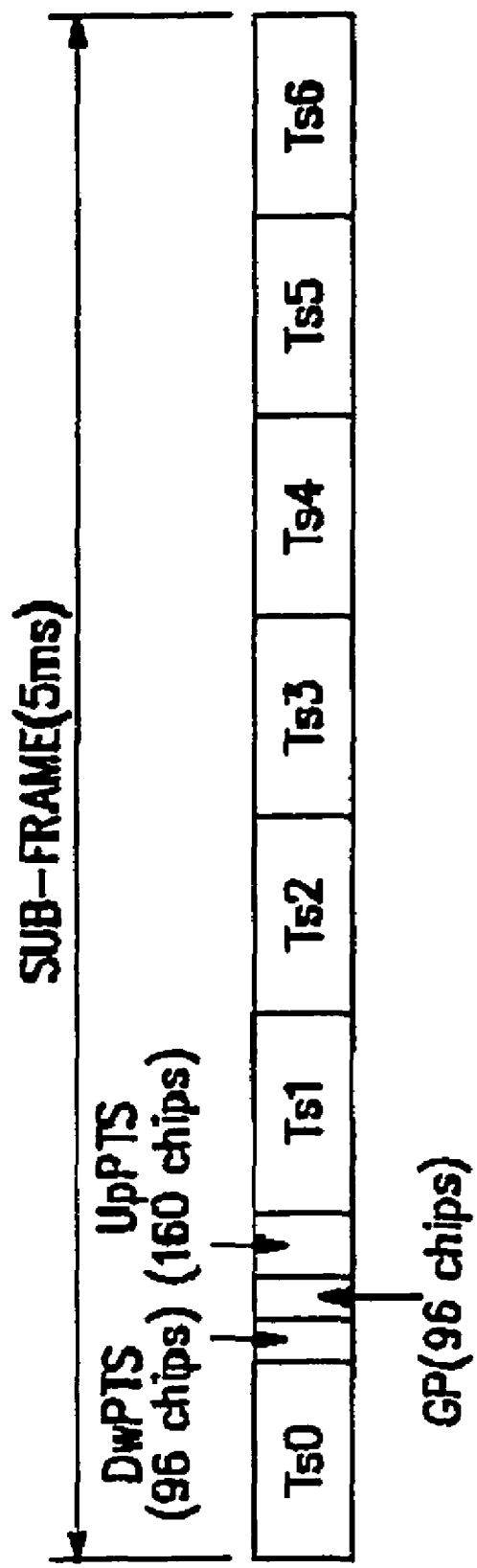
FIG. 3 illustrates a detailed structure of the sub-frame shown in FIG. 2.

FIG. 3 illustrates a detailed structure of the sub-frame shown in FIG. 2. Referring to FIG. 3, the sub-frame is comprised of 7 time slots Ts0-Ts6, one downlink pilot time slot (DwPTS), one uplink pilot time slot (UpPTS), and one GP. The time slot Ts0 is always used for the downlink transmission and the time slot Ts1 is always used for the uplink transmission. The time slot used for the downlink transmission is separated from the time slot used for the uplink transmission by a switching point. Two switching points exist in one sub-frame. Each time slot is comprised of 864 chips, and transmitted at a chip rate of $1.28 \times 10^6$ chips per second. Between the first time slot and the second time slot, there exist the 96-chip DwPTS, the 160-chip UpPTS and the 96-chip GP. The GP intervening between the DwPTS and the UpPTS is used to separate the DwPTS from the UpPTS.

Figure 4:
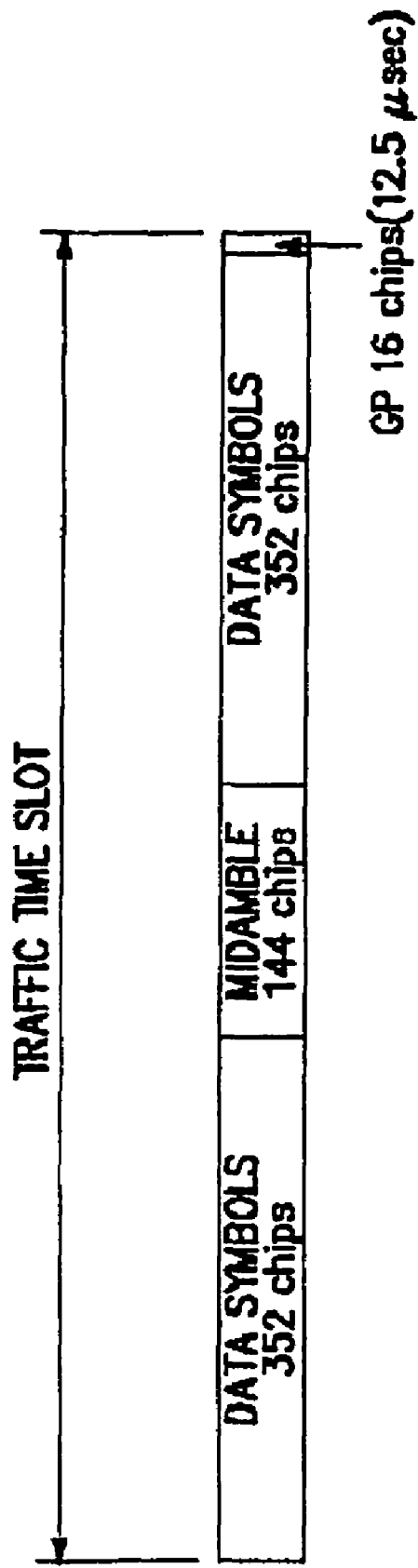
FIG. 4 illustrates a detailed structure of the respective time slots shown in FIG. 3.

FIG. 4 illustrates a detailed structure of the respective time slots shown in FIG. 3. Referring to FIG. 4, each time slot has a length of 864 chips. The time slot is comprised of two 352-chip data symbol periods, a 144-chip midamble signal period intervening therebetween, and a 16-chip GP. For the downlink time slot transmitted from a Node B, the midamble signal is used when a UE determines which channels have been transmitted from the Node B and also determines the channel environment between the Node B and the UE. In addition, for the uplink time slot transmitted from the UE, the Node B analyzes the midamble signal to determine which UE uses the channel and estimate the channel environment between the Node B and the UE. The midamble signals are associated with the corresponding downlink and uplink channels, and used to estimate which channel or which subscriber transmits the signals. The GP has a length of 16 chips, and serves to separate the time slots.

Figure 5:
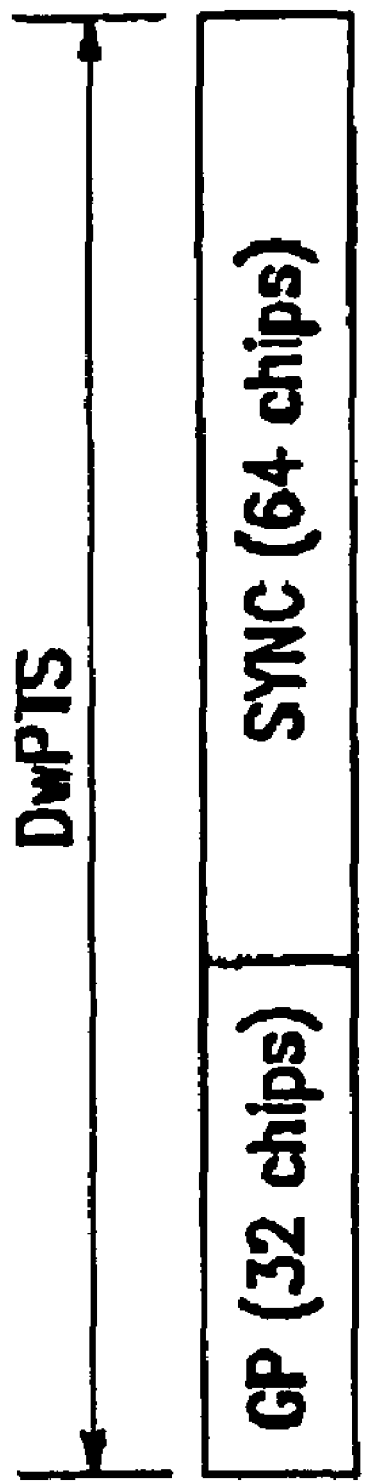
FIG. 5 illustrates a detailed structure of the DwPTS (Downlink Pilot Time Slot) shown in FIG. 3.

FIG. 5 illustrates a detailed structure of the DwPTS shown in FIG. 3. Referring to FIG. 5, the 96-chip DwPTS is divided into a 32-chip GP and a 64-chip synchronization sequence (hereafter, referred to as "SYNC"). The SYNC is used by the UE for downlink synchronization, channel estimation, uplink open loop power control, and random access procedures.

Figure 6:
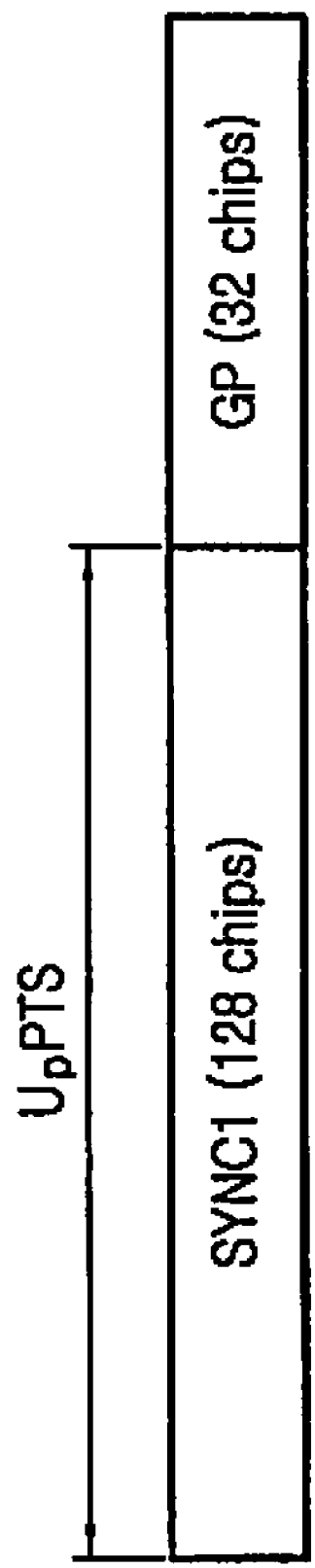
FIG. 6 illustrates a detailed structure of the UpPTS (Uplink Pilot Time Slot) show in FIG. 3.
Figure 7:
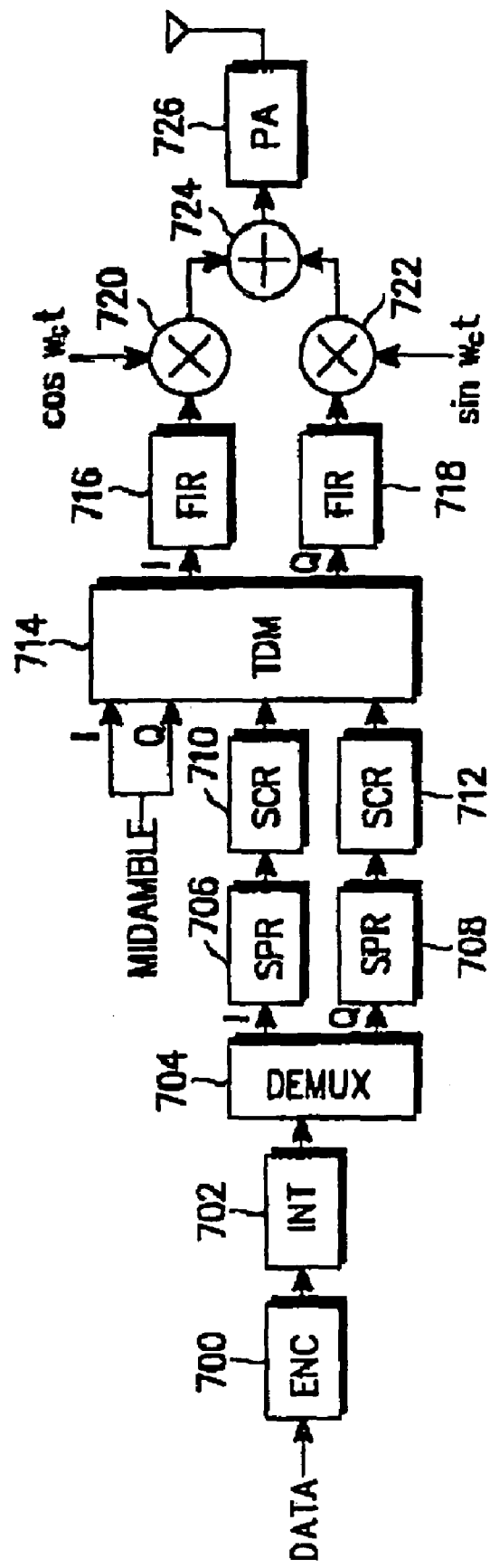
FIG. 7 illustrates a structure of a general transmitter not employing a diversity scheme in a Node B for a W-TDD or NB-TDD mobile communication system.
Figure 8:
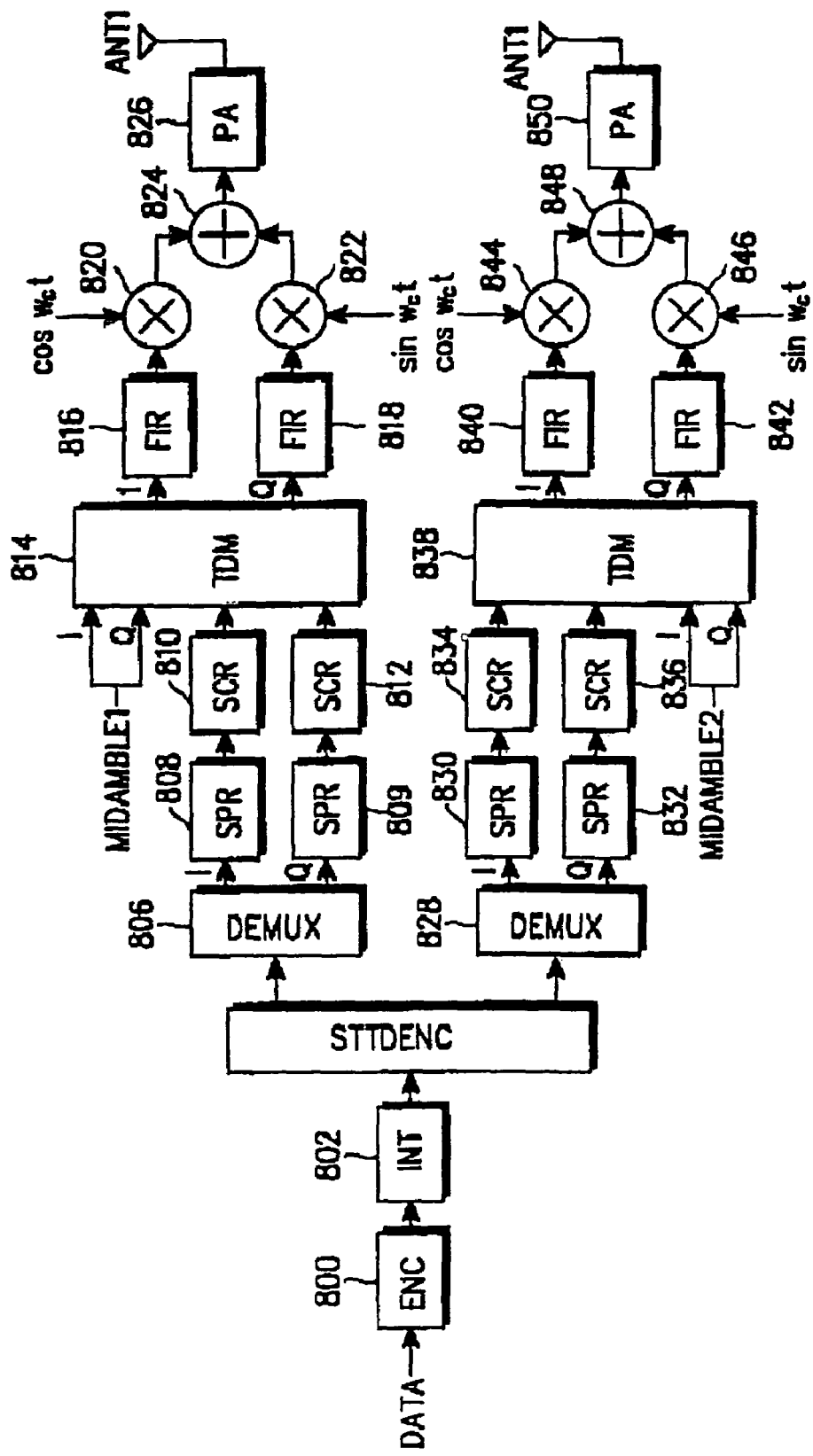
FIG. 8 illustrates a structure of a common Node B transmitter using the STTD scheme, an open loop TSTD scheme, in a W-TDD mobile communication system.
Figure 9:
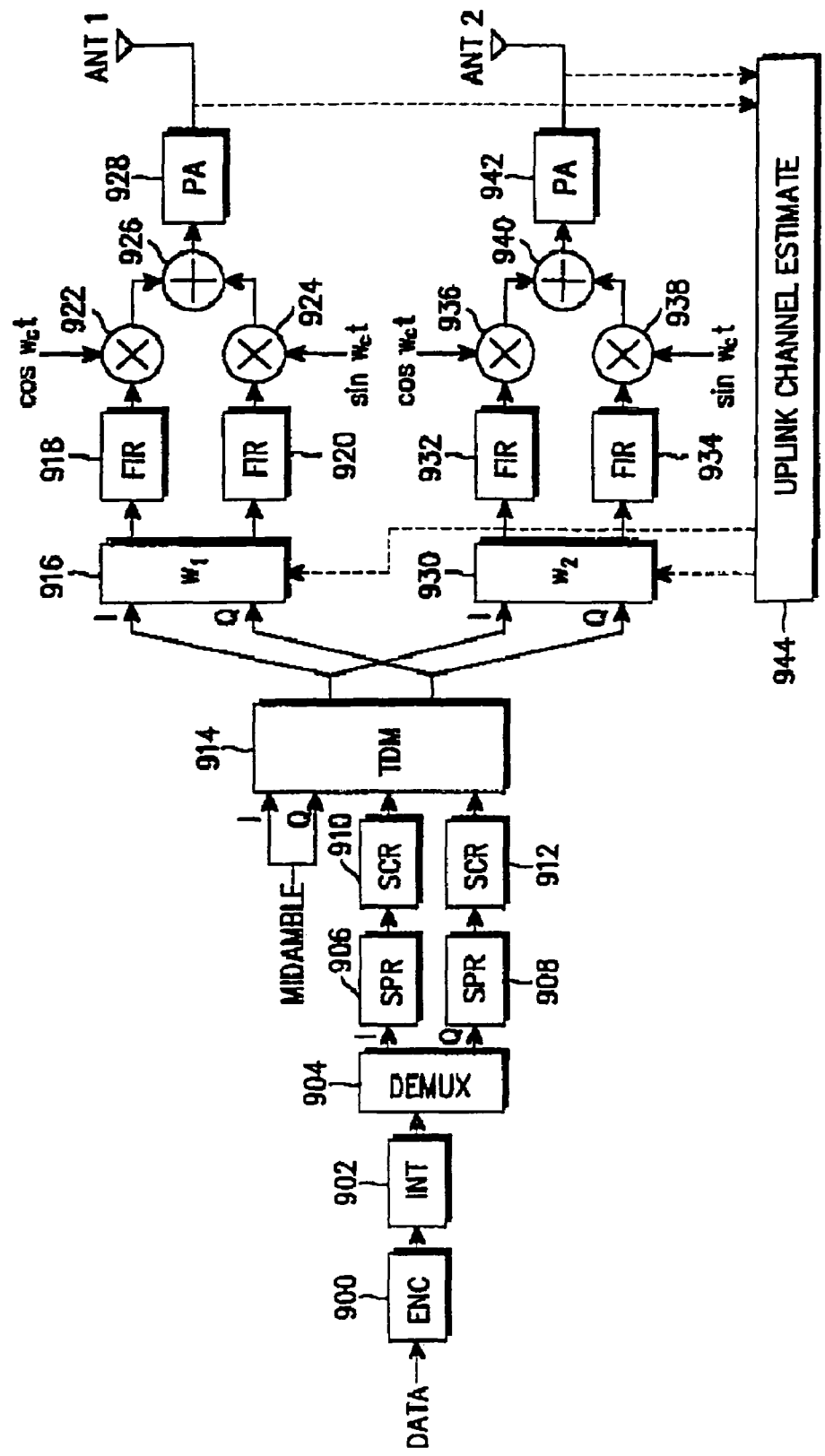
FIG. 9 illustrates a structure of a common Node B transmitter using the closed-loop TSTD scheme in a W-TDD or NB-TDD mobile communication system.

FIG. 6 illustrates a detailed structure of the UpPTS show in FIG. 3. Referring to FIG. 6, the 160-chip UpPTS is comprised of a 128-chip synchronization sequence SYNC1 and a 32-chip GP. The SYNC1 is used by the UE for uplink synchronization, channel estimation, downlink open loop power control and random access procedures.

Although the NB-TDD mobile communication system basically employs QPSK (Quadrature Phase Shift Keying) modulation, it can also employ 8 PSK (8-ary Phase Shift Keying), 64 QAM (64-ary Quadrature Amplitude Modulation), and 16 QAM (16-ary QAM) modulations. A data rate of the channels is determined according to a spreading factor (SF) and modulation in use. In addition, the frames used in the NB-TDD mobile communication system have the same structure as described with reference to FIGS. 2 to 6. As described above, one 10 ms frame is divided into two sub-frames, and each sub-frame is comprised of 7 time slots Ts0-Ts6, one DwPTS, one UpPTS and one GP. Each time slot has a length of 864 chips, of which the last 16 chips on the time axis are used for the GP. The 16-chip GP corresponds to 12.5 μsec in terms of time. Therefore, the 12.5 μsec non-transmission period GP always intervenes between sub-frames. Further, it is noted in the sub-frame structure shown in FIG. 3 that downlink transmission is not available for a 1120-chip (875 μsec) period comprised of the 96-chip GP, the succeeding UpPTS and the time slot Ts1. That is, for the 1120-chip period, the Node B just receives data from the UE and does not transmit data to the UE. Finally, in the sub-frame structure shown in FIG. 3, uplink transmission is not available for a 1056-chip (825 μsec) period comprised of the 864-chip Ts0, the 96-chip DwPTS and the 96-chip GP. That is, for the 1056-chip period, the Node B just transmits data to the UE and does not receive data from the UE.

The TSTD scheme proposed by the invention implements the transmit diversity using the non-transmission period existing in each frame or time slot of the TDD mobile communication system. That is, the TSTD scheme switches the transmission antennas using the non-transmission period where no data is transmitted, thereby guaranteeing continuous data transmission. Therefore, the W-TDD mobile communication system implements the transmit diversity using the 25 μsec GP existing in each time slot of the frame. By using the 25 μsec GP, it is possible to implement the transmit diversity in a subframe unit or a time slot unit. Meanwhile, the NB-TDD mobile communication system implements the transmit diversity using the 12.5 μsec GP existing in each time slot of the sub-frame, the 875 μsec downlink non-transmission period, or 825 μsec uplink non-transmission period. As shown in FIG. 3, the 875 μsec downlink non-transmission period is comprised of the 25 μsec GP, the 75 μsec UpPTS and 775 μsec Ts1, while the 825 μsec uplink non-transmission period is comprised of the 775 μsec Ts0, the 25 μsec DwPTS and the 25 μsec GP.

Therefore, the NB-TDD mobile communication system can support both the transmit diversity in the frame unit and the transmit diversity in the time slot unit, by using the 12.5 μsec GP. Further, it is possible to support the transmit diversity in a sub-frame unit by using the 875 μsec downlink non-transmission period or the 825 μsec uplink non-transmission period.

Figure 11:
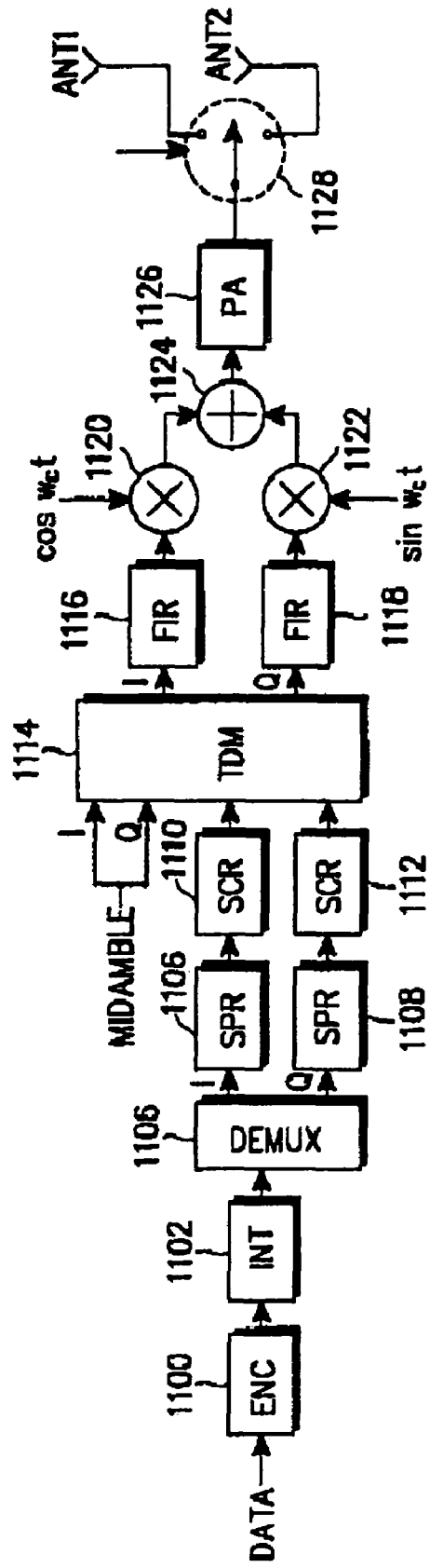
FIG. 11 illustrates a structure of a transmit diversity transmitter using the TSTD scheme in a W-TDD or NB-TDD mobile communication system according to an embodiment of the present invention.

FIG. 11 illustrates a structure of a transmit diversity transmitter using the TSTD scheme in a W-TDD or NB-TDD mobile communication system according to an embodiment of the present invention.

Referring to FIG. 11, data to be transmitted by the transmitter is made into frame data in an upper layer and provided to a channel encoder 1100. The frame data is encoded into a coded symbol stream at a predetermined coding rate by a channel encoder 1100. The coded symbol stream is interleaved by an interleaver 1102, and then, demultiplexed by a demultiplexer 1104 into an I channel and a Q channel, creating a pair of complex channels. For example, the demultiplexer 1104 divides the interleaved coded symbols into odd-numbered coded symbols defined as I channel signals, and even-numbered coded symbols defined as Q channel signals. Among the complex channels, the signals on the I channel, a real channel signal, are spread by a first spreader 1106 with an OVSF code, while the signals on the Q channel, an imaginary channel, are spread by a second spreader 1108 with the OVSF code. The signals on the complex channels I and Q spread with the OVSF code are scrambled with a scrambling code by first and second scramblers 1110 and 1112, respectively. The scrambled signals are multiplexed with a midamble sequence on a time axis by a time division multiplexer (TDM) 1114. Here, output signals of the TDM 1114 have a frame structure for the TDD mobile communication system, shown in FIGS. 1 to 4. The I and Q-channel signals output from the TDM 1114 are provided to a first multiplier 1120 and a second multiplier 1122 through a first FIR filter 1116 and a second FIR filter 1118, respectively. The I-channel signal is multiplied by a carrier signal $\cos(\omega_c t)$ by the first multiplier 1120, and the Q-channel signal is multiplied by a carrier signal $\sin(\omega_c t)$ by the second multiplier 1122, thus outputting modulated radio frequency (RF) signals. The modulated RF signals are added by an adder 1124, and then, amplified by a power amplifier (PA) 1126.

Figure 10:
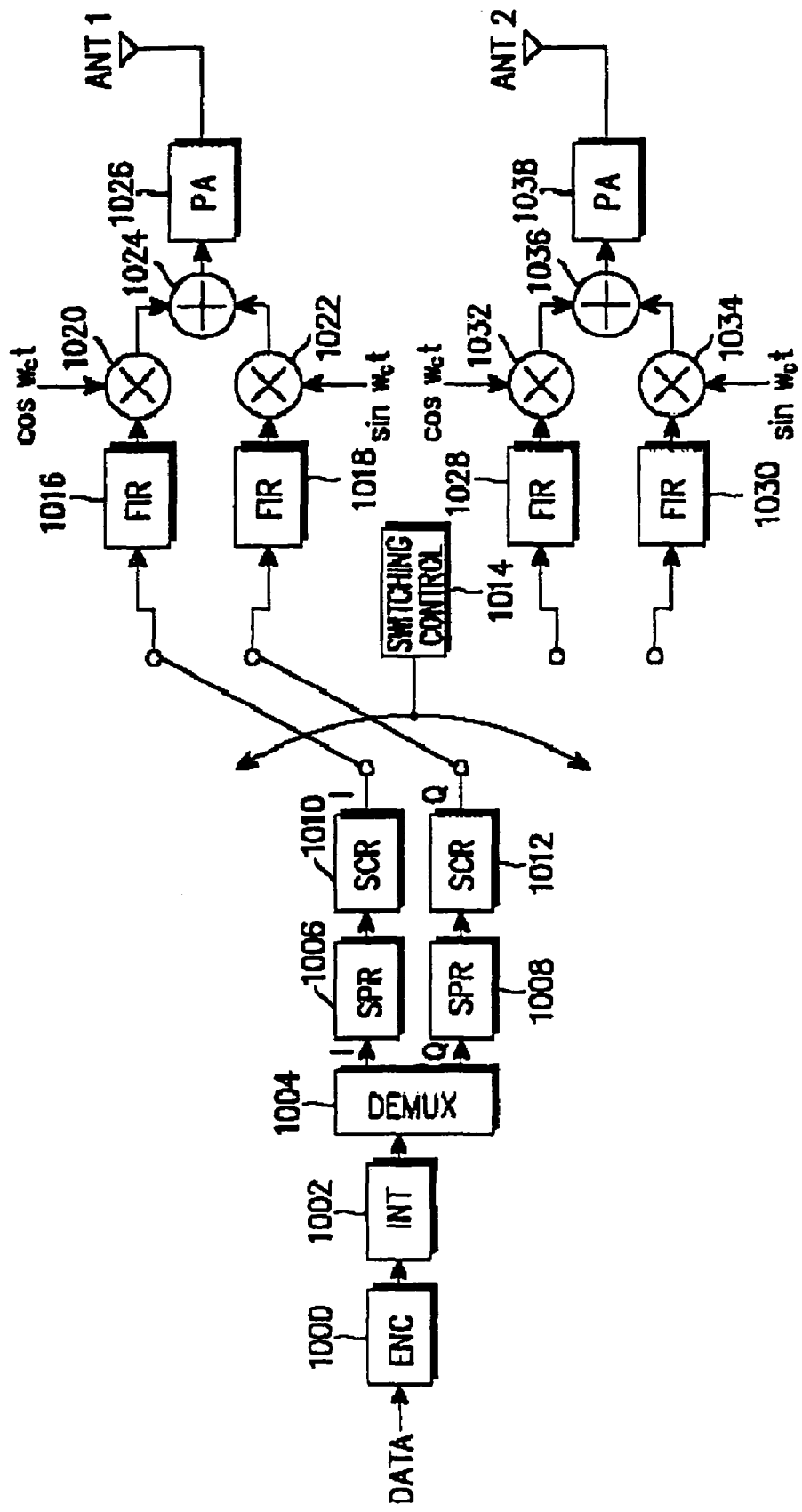
FIG. 10 illustrates a structure of a common Node B transmitter using the TSTD scheme in a FDD mobile communication system.

The amplified analog signals are alternately switched to first and second antennas 1130 and 1132 at stated periods by a switch 1128. The switch 1128 requires a given operating time in order to switch the analog signals from the first antenna 1130 to the second antenna 1132, or from the second antenna 1132 to the first antenna 1130. The FDD mobile communication system cannot use an analog switch because there is no period (interval) between the frames. Therefore, in order to switch the signals, the FDD mobile communication system should switch the digital signals as shown in FIG. 10. However, the W-TDD or NB-TDD mobile communication system to which the present invention is to be applied has a period where the analog signals can be switched. That is, the W-TDD mobile communication system can switch the analog signals at every frame or every time slot in the predefined 25 µsec period. Similarly, the NB-TDD mobile communication system can switch the analog signals at every sub-frame or every time slot in the predefined 12.5 µsec, 875 µsec or 825 µsec downlink/uplink non-transmission period.

Reference will now be made to an operation in the switchable periods. The PA 1126 is disabled at a start point of the switchable period, and when an output power level of the PA 1126 is lowered to a predetermined level, the switch 1128 is switched to another antenna. After a lapse of the switchable period, the PA 1126 is enabled before the start of the downlink transmission so that the PA 1126 can operate in an active region. As a result, the signals output from the PA 1126 in a normal mode after a lapse of the switchable period are transmitted through a new antenna by the switch 1128.

First, a detailed description will be made of an exemplary method for performing a switching operation in a 10 ms-frame unit in the W-TDD mobile communication system to which the TSTD scheme according to the present invention is applied.

In the W-TDD mobile communication system having a 25 µsec switchable period, the transmitter switches between the first and second antennas 1130 and 1132 100 times for one second using the 25 µsec period. As a result, the first and second antennas 1130 and 1132 each alternately transmit the signals 50 times for one second, for approximately 10 msec at each transmission. Since the path switching between the PA 1126 and the first and second antennas 1130 and 1132 is performed for the 25 µsec period, it is possible to obtain a diversity gain using the single PA 1126. The diversity scheme proposed by the present invention can be applied to both the Node B transmitter and the UE transmitter of the W-TDD mobile communication system.

Figure 12:
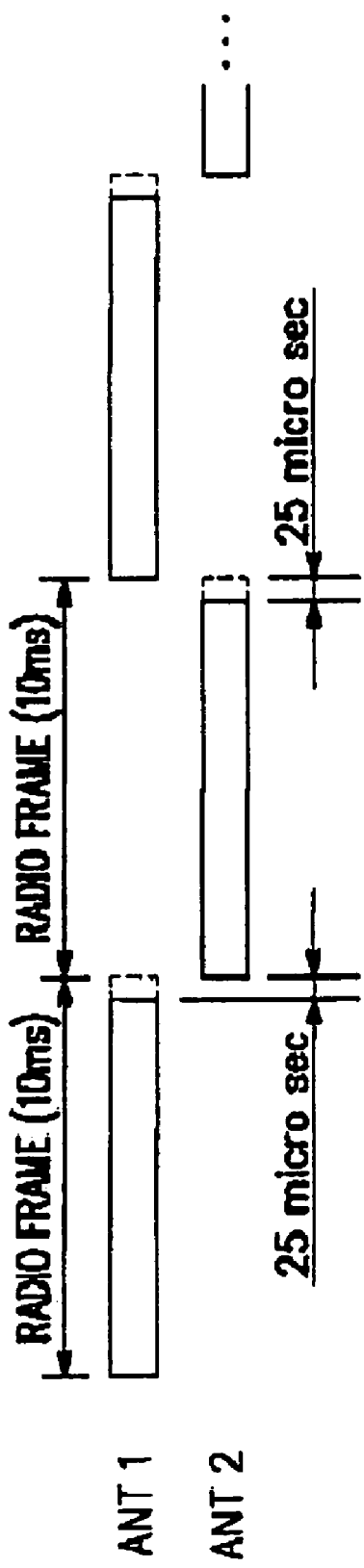
FIG. 12 illustrates a transmission pattern of frames transmitted through two antennas on a time axis in a W-TDD mobile communication system to which the TSTD scheme according to an embodiment of the present invention is applied.

FIG. 12 illustrates a transmission pattern of frames transmitted through two antennas on a time axis in a W-TDD mobile communication system to which the TSTD scheme according to the present invention is applied.

Referring to FIG. 12, in the W-TDD mobile communication system to which the TSTD scheme according to the present invention is applied, the first and second antennas 1130 and 1132 alternately transmit 10 ms frames. The switching from the first antenna 1130 to the second antenna 1132 or the switching from the second antenna 1132 to the first antenna 1130 is performed in the 25 µsec GP intervening between the frames.

Next, a detailed description will be made of an exemplary method for performing a switching operation in a 5 ms sub-frame unit in the NB-TDD mobile communication system to which the TSTD scheme according to the present invention is applied.

In the NB-TDD mobile communication system, the transmitter switches between the first and second antennas 1130 and 1132 200 times for one second. As a result, the first and second antennas 1130 and 1132 each alternately transmit the signals 100 times for one second, for approximately 5 msec at each transmission. Since the path switching between the PA 1126 and the first and second antennas 1130 and 1132 is performed for a predefined non-transmission period where no data is transmitted, it is possible to obtain a diversity gain using the single PA 1126. The diversity scheme proposed by the present invention can be applied to both the Node B transmitter and the UE transmitter of the NB-TDD mobile communication system.

Since the NB-TDD mobile communication system has a plurality of non-transmission periods, the path switching between the power amplifier and the antennas is differently performed in (1) a case where the 12.5 µsec period located at the end of each sub-frame is used, and (2) a case where the 96-chip GP and its neighboring downlink/uplink non-transmission period are used. That is, the case (2) is divided into one case where the 825 µsec uplink non-transmission period comprised of the Ts0, the DwPTS and the GP is used, and another case where the 875 µsec downlink non-transmission period comprised of the GP, the UpPTS and the Ts1 is used.

Figure 13A:
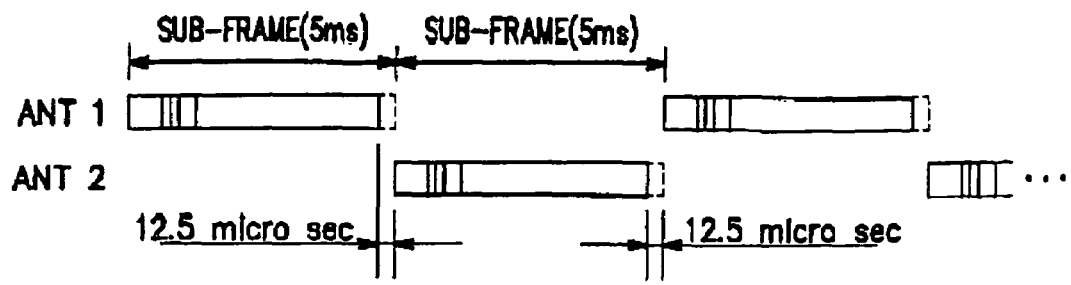
FIG. 13A illustrates a transmission pattern of frames transmitted through two antennas on a time axis in an NB-TDD mobile communication system to which the TSTD scheme using the 12.5 μsec period is applied.

FIG. 13A illustrates a transmission pattern of frames transmitted through two antennas on a time axis in an NB-TDD mobile communication system to which the TSTD scheme using the 12.5 µsec period is applied.

Referring to FIG. 13A, the first and second antennas 1130 and 1132 alternately transmit the 5 ms sub-frames. The switching from the first antenna 1130 to the second antenna 1132 or the switching from the second antenna 1132 to the first antenna 1130 is performed in the 12.5 µsec GP intervening between the sub-frames. The GP intervening between the sub-frames refers to the GP constituting the last time slot of the sub-frame. The example shown in FIG. 13A can be applied to both the Node B transmitter and the UE transmitter.

Figure 13B:
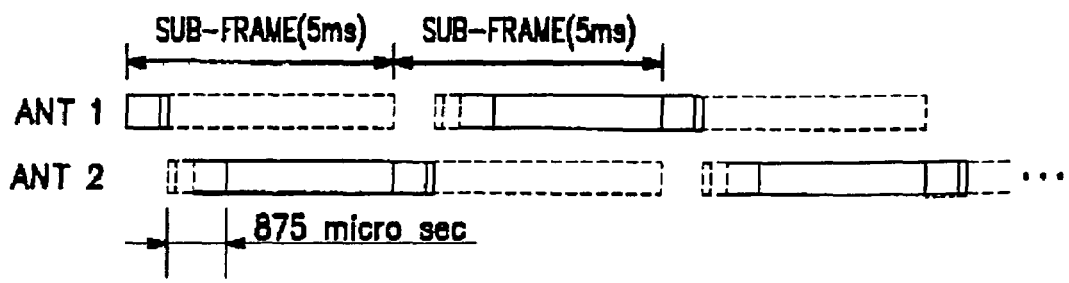
FIG. 13B illustrates a transmission pattern of frames transmitted through two antennas on a time axis in an NB-TDD mobile communication system to which the TSTD scheme using the 875 μsec downlink non-transmission period is applied.

FIG. 13B illustrates a transmission pattern of frames transmitted through two antennas on a time axis in an NB-TDD mobile communication system to which the TSTD scheme using the 875 µsec downlink non-transmission period is applied.

Referring to FIG. 13B, the first and second antennas 1130 and 1132 alternately transmit partial data of a previous sub-frame and partial data of a current sub-frame at 5 ms periods. The partial data of the previous sub-frame includes the time slots Ts1 to Ts6 among the 7 time slots constituting the previous sub-frame, and the partial data of the current sub-frame includes the time slot Ts0 among the 7 time slots constituting the current sub-frame and the DwPTS. The switching from the first antenna 1130 to the second antenna 1132 or the switching from the second antenna 1132 to the first antenna 1130 is performed in the GP, UpPTS and Ts1 periods of 875 μsec of the subframe. The example shown in FIG. 13B is applied only to the Node B transmitter, since the downlink non-transmission period is used.

Figure 13C:
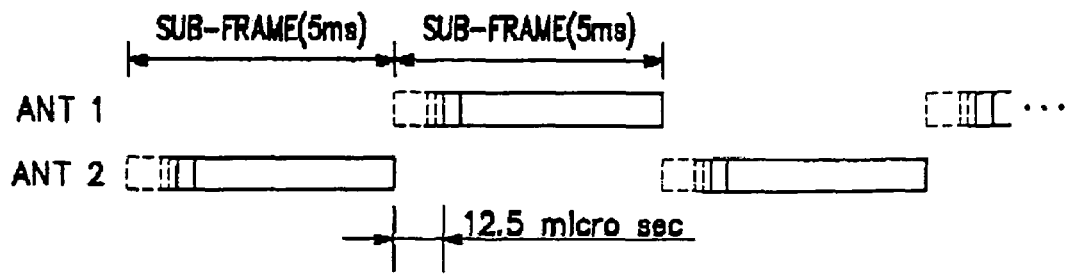
FIG. 13C illustrates a transmission pattern of frames transmitted through two antennas on a time axis in an NB-TDD mobile communication system to which the TSTD scheme using the 825 μsec uplink non-transmission period is applied.

FIG. 13C illustrates a transmission pattern of frames transmitted through two antennas on a time axis in an NB-TDD mobile communication system to which the TSTD scheme using the 825 μsec uplink non-transmission period is applied.

Referring to FIG. 13C, the first and second antennas 1130 and 1132 alternately transmit partial data of the sub-frame at 5 ms periods. The partial data of the sub-frame includes the entire data excepting the Ts0, the DwPTS and the GP of the sub-frame, i.e., includes the UpPTS and the time slots Ts1 to Ts6. The switching from the first antenna 1130 to the second antenna 1132 or the switching from the second antenna 1132 to the first antenna 1130 is performed in the Ts0, DwPTS and GP periods of 825 μsec of the subframe. The example shown in FIG. 13C is applied only to the UE transmitter, since the uplink non-transmission period is used.

For the TSTD transmission, two spaced-apart antennas are used. The two antennas may be either two independent antennas or a part of an antenna array.

Figure 14A:
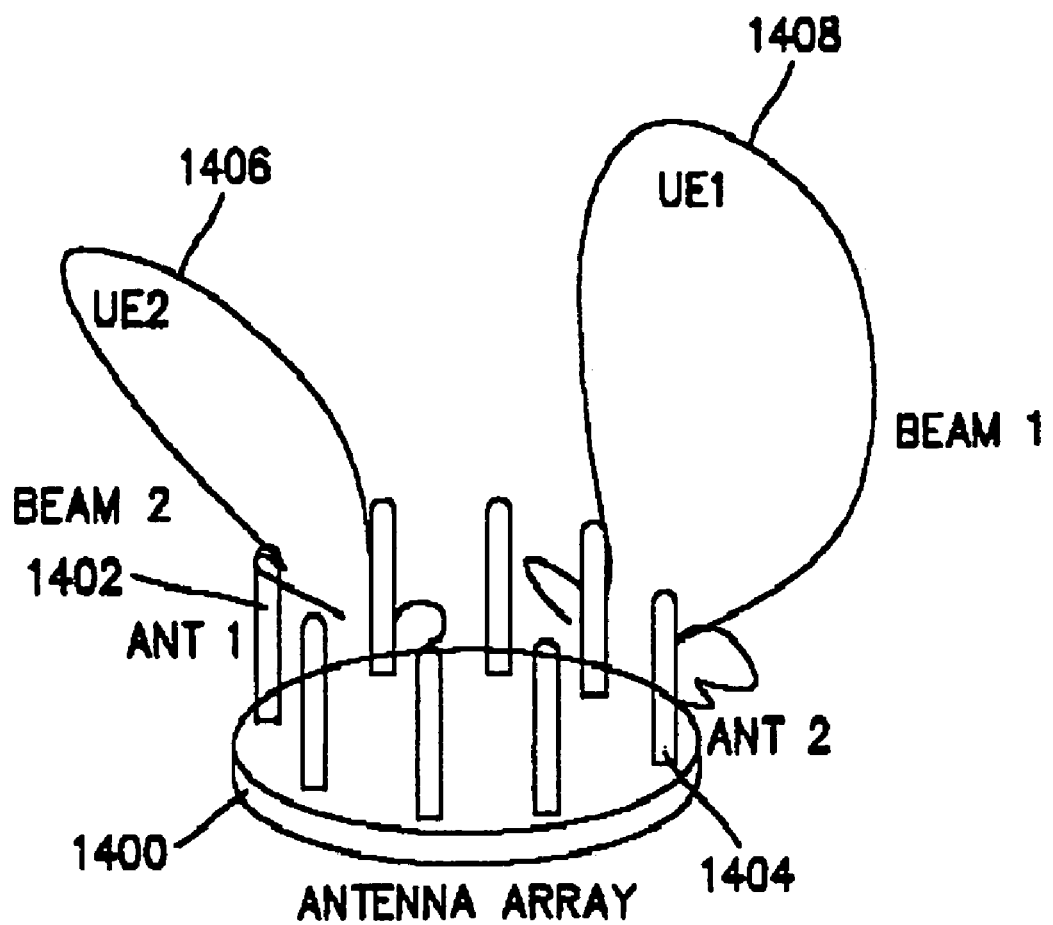
FIGS. 14A and 14B illustrate an antenna array used for signal transmission by the TSTD scheme according to an embodiment of the present invention.
Figure 14B:
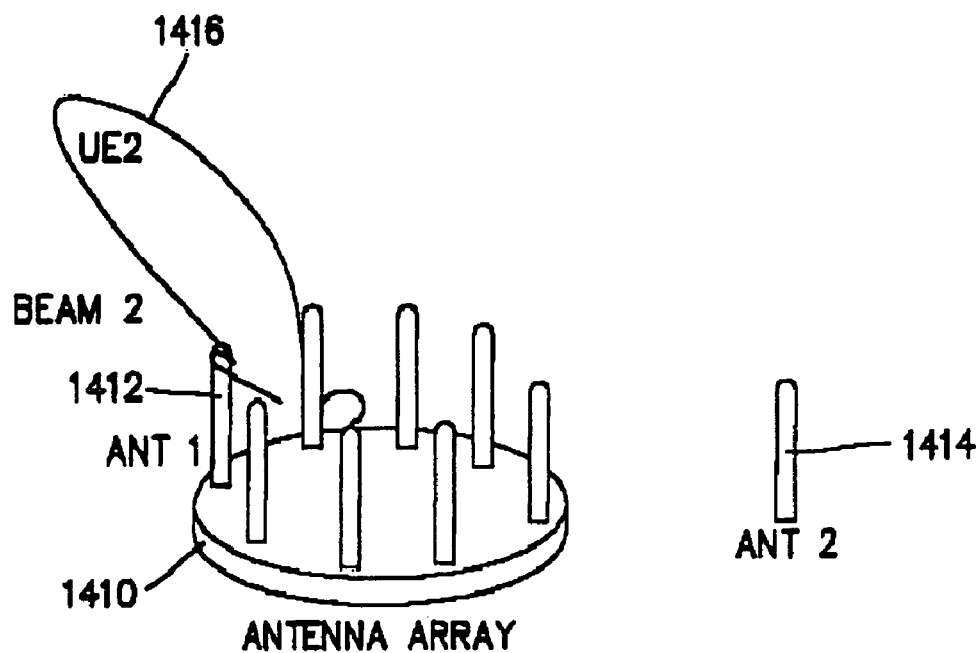

FIGS. 14A and 14B illustrate an antenna array used for signal transmission by the TSTD scheme according to an embodiment of the present invention.

In FIG. 14A, the signals output in a TSTD mode are transmitted through a first antenna 1402 and a second antenna 1404. Reference numeral 1406 indicates a form of a beam transmitted from the first antenna 1402, and reference numeral 1408 indicates a form of a beam transmitted from the second antenna 1404. The first and second antennas 1402 and 1404 are most remotely spaced apart in a beam forming antenna array 1400. In this case, a beam former is used for transmission of the dedicated channel, while the two most remotely spaced-apart antennas of the antenna array are used for transmission of the shared channel.

In FIG. 14B, the signals output in the TSTD mode are transmitted using one antenna 1412 among a plurality of antennas constituting a beam forming antenna array 1410 and another independent antenna 1414. In this case also, the beam former is used for transmission of the dedicated channel, while the first and second antennas 1412 and 1414 are used for transmission of the shared channel.

Figure 14C:
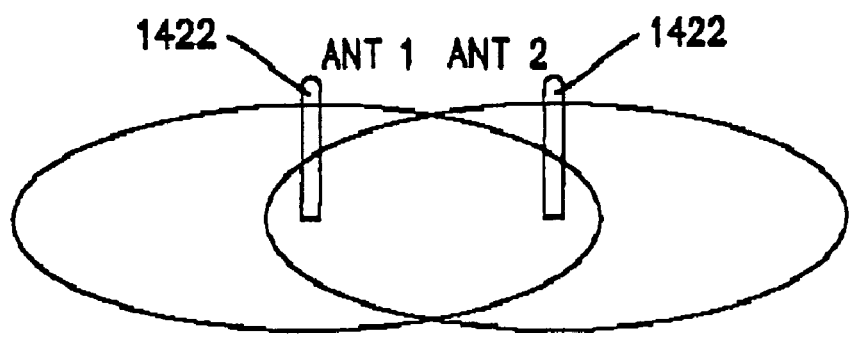
FIG. 14C illustrates how the signals output in a TSTD mode are transmitted through two independent antennas.

FIG. 14C illustrates how the signals output in a TSTD mode are transmitted through two independent antennas. The TSTD scheme according to an embodiment of the present invention transmits the signals by alternately using two transmission antennas in a sub-frame unit. If the existing power control method for a single-antenna transmitter is applied to the present invention, a time difference of two sub-frames occurs between a time point where receiving power is measured to create a power control command and a time point where power control is actually performed based on the measured receiving power. Thus, it is not possible to correctly perform the power control depending on a variation in the channel environments.

Reference will now be made to a power control method according to two different embodiments of the present invention.

First Embodiment

Figure 15:
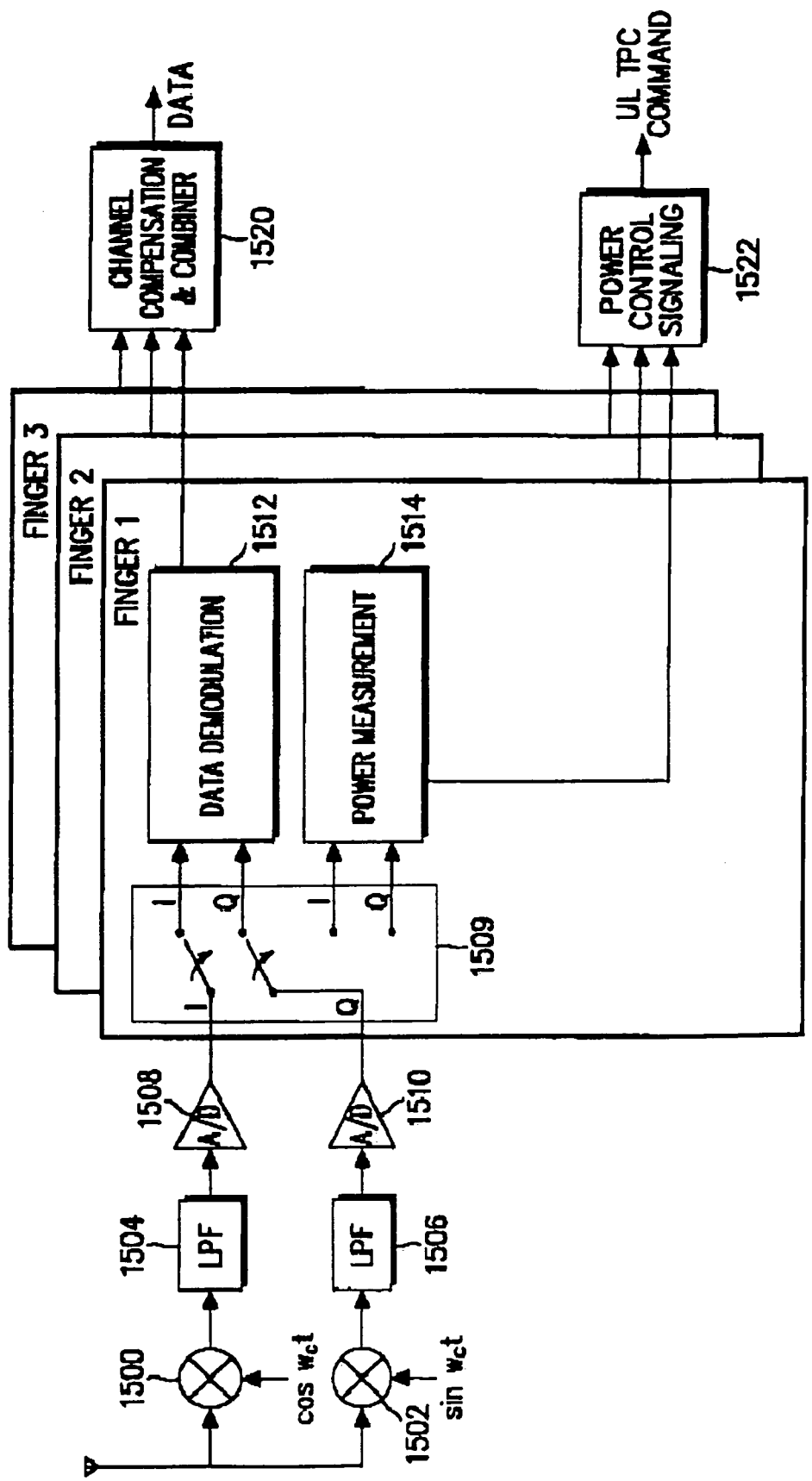
FIG. 15 illustrates a structure of a receiver to which a power control method according to a first embodiment of the present invention is applied.
Figure 16:
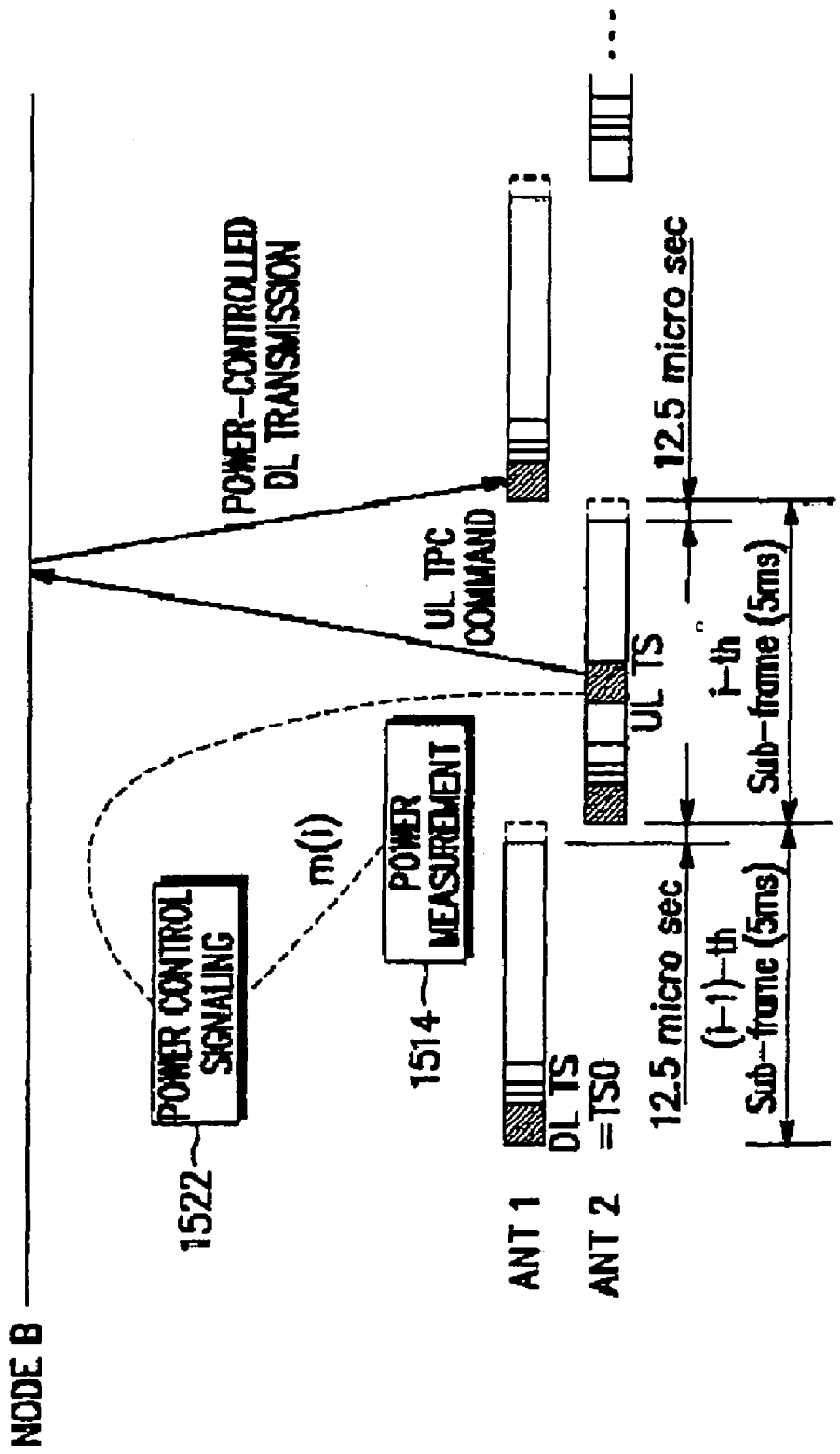
FIG. 16 illustrates a conceptual signal processing flow for the power control method according to the first embodiment of the present invention.
Figure 17:
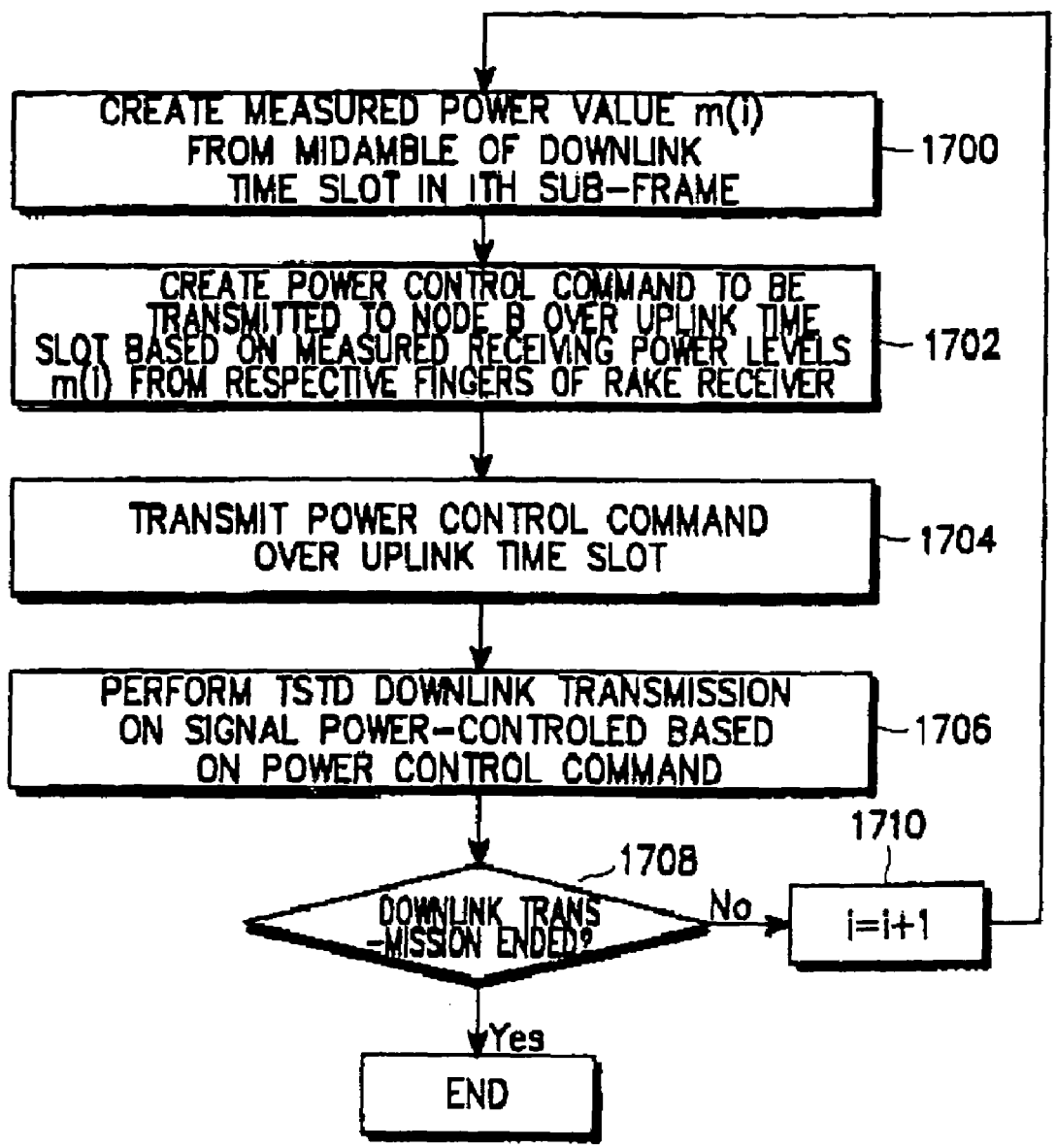
FIG. 17 illustrates a procedure for performing power control according to the first embodiment of the present invention.

FIG. 15 illustrates a structure of a receiver to which a power control method according to a first embodiment of the present invention is applied. The power control method according to the first embodiment of the present invention is a power control method for an NB-TDD mobile communication system using the TSTD scheme. FIG. 16 illustrates a conceptual signal processing flow for the power control method according to the first embodiment of the present invention. FIG. 17 illustrates a procedure for performing power control according to the first embodiment of the present invention.

A detailed description will be made of the power control method according to the first embodiment of the present invention with reference to FIGS. 15 to 17.

The signals transmitted by the TSTD scheme in the Node B transmitter are received through a single antenna at the UE. For demodulation, the signals received through the single antenna are multiplied by $\cos \omega_c t$ and $\sin \omega_c t$ by demodulators 1500 and 1502, respectively. The two demodulated signals are converted to baseband signals by associated lowpass filters (LPFs) 1504 and 1506, respectively. The analog baseband signals are converted to digital signals by analog-to-digital (A/D) converters 1508 and 1510, respectively. The output signals of the A/D converts 1508 and 1510 are signals where the data is time-multiplexed with the midamble. Therefore, the output signals of the A/D converts 1508 and 1510 are provided to time demultiplexers 1509 associated with a plurality of fingers constituting a Rake receiver, and then, demultiplexed into the data and the midamble. That is, when considered on the basis of one sub-frame, the time demultiplexer 1509 switches the A/D converts 1508 and 1510 to a data demodulator 1512 for the respective data periods of the time slots constituting the sub-frame, and switches the A/D converts 1508 and 1510 to a power measurer 1514 in the respective midamble periods of the time slots.

The data signal demultiplexed by the time demultiplexer 1509 is detected by the data demodulator 1512. The data demodulator 1512 is provided to the respective fingers constituting the Rake receiver, so that the Rake receiver outputs the detected data signals, the number of which is equal to the number of the fingers. The detected signals from the data demodulators 1512 included in the respective fingers are provided to a channel compensator & combiner 1520. The channel compensator & combiner 1520 combines the detected signals depending on channel information estimated using the pilot, and outputs final data.

The midamble signal demultiplexed by the time demultiplexer 1509 is provided to the power measurer 1514. A procedure for separating the midamble signal from the sub-frame corresponding to the received signal and providing the demultiplexed midamble signal to the power measurer 1514 is illustrated in FIG. 16. For example, FIG. 16 shows an exemplary method for separating the midamble from the time slot Ts0 among the downlink time slots. However, it is obvious to those skilled in the art that the accessing downlink time slot can be varied according to the UE. Upon receiving the midamble, the power measurer 1514 outputs a measured power level m(i) of the received signal at every $i^{th}$ sub-frame depending on the received midamble. Here, the $i^{th}$ sub-frame refers to the currently received sub-frame. Since the power measurer 1514 is included in the respective fingers constituting the Rake receiver, the Rake receiver will output the measured power levels, the number of which is equal to the number of the fingers. A procedure for providing the measured power level m(i) to a power control signaling part 1522 is represented by a dotted line in FIG. 16. For this, see step 1700 of FIG. 17.

The measured power levels m(i) output from the respective fingers of the Rake receiver are provided to the power control signaling part 1522, which creates a power control command to be provided to the Node B based on the measured power levels m(i). A procedure for creating the power control command depending on the measured power levels m(i) by the power control signaling part 1522 is performed in step 1702 of FIG. 17.

Figure 21:
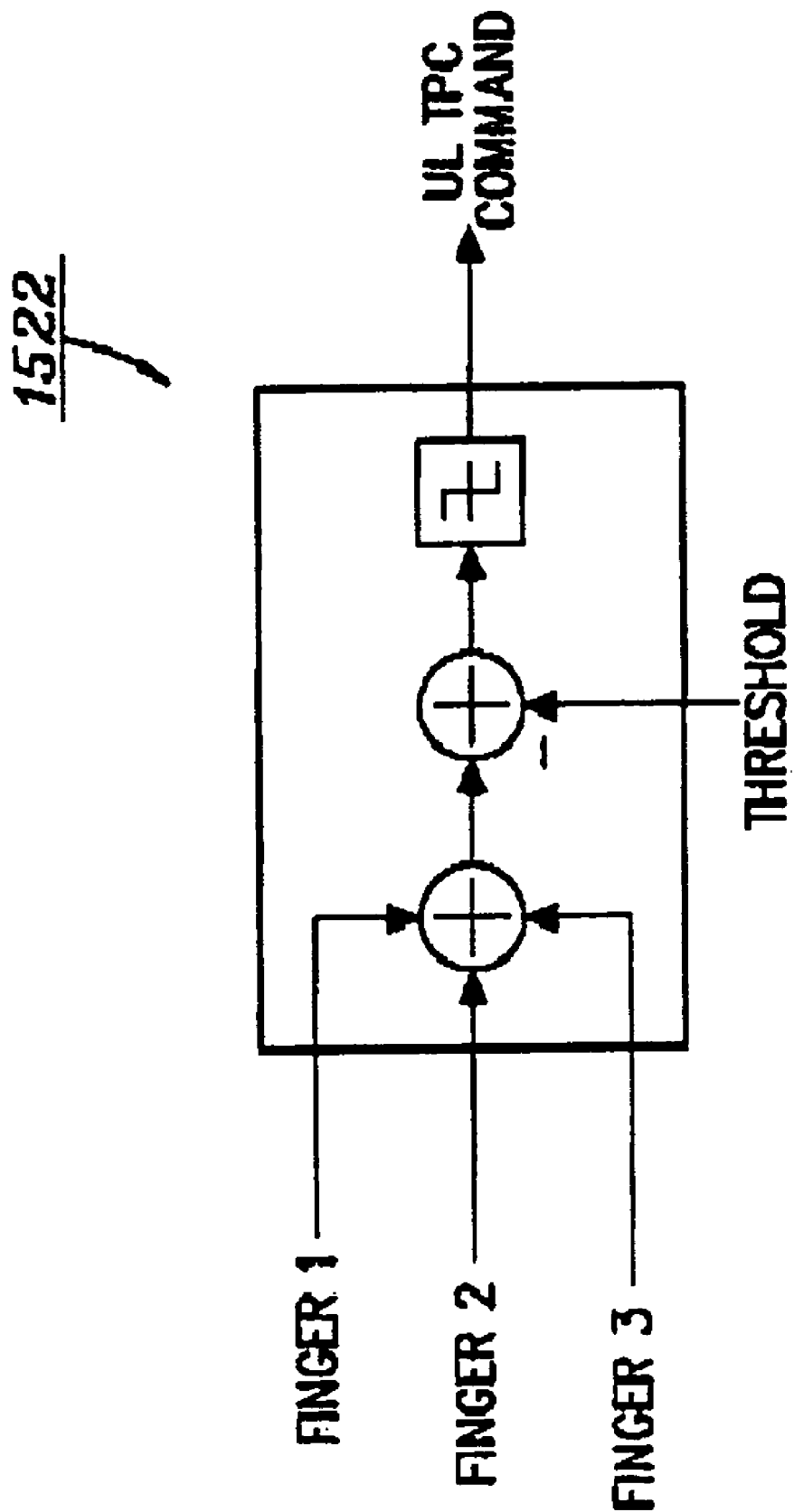
FIG. 21 illustrates a detailed structure of the power control signaling part shown in FIGS. 15 and 18.

FIG. 21 illustrates a structure of the power control signaling part 1522. An operation of the power control signaling part 1522 will be described in detail with reference to FIG. 21. The measured power levels m(i) output from the respective fingers of the Rake receiver are added by an adder, and then, provided to a subtracter. The subtracter subtracts a threshold value determined by outer loop power control from the resulting value of the adder. The resulting value from the subtracter is compared with '0' by a comparator. As a result of the comparison, if the resulting value from the subtracter is larger than '0', the power control signaling part 1522 outputs a power-down command (i.e., a bit '0') to decrease downlink transmission power. If, however, the resulting value from the subtracter is smaller than '0', the power control signaling part 1522 outputs a power-up command (i.e., a bit '1') to increase the downlink transmission power.

The power control command created by the power control signaling part 1522 is transmitted along with an uplink time slot to be assigned to itself among the uplink time slots of the sub-frame to be first and foremost transmitted to the Node B. A procedure for transmitting the power control command created by the power control signaling part 1522 along with a predetermined time slot is shown in step 1704 of FIG. 17.

Upon receiving the power control command from the UE over the predetermined time slot, the Node B performs power control on the sub-frame to be transmitted next depending on the received power control command, in step 1706 of FIG. 17.

After receiving the power-controlled sub-frame from the Node B, the UE receiver determines in step 1708 of FIG. 17 whether downlink transmission from the Node B is completed, i.e., determines whether there is no more frame to be transmitted from the Node B. If it is determined that there is a frame to be transmitted next from the Node B, the UE receiver increases i by one to perform power control on the next sub-frame in step 1710, and then, returns to the step 1700 to repeat the above-stated operation. However, if it is determined that there is no more frame to be transmitted from the Node B, the UE receiver ends the operation.

Second Embodiment

Figure 18:
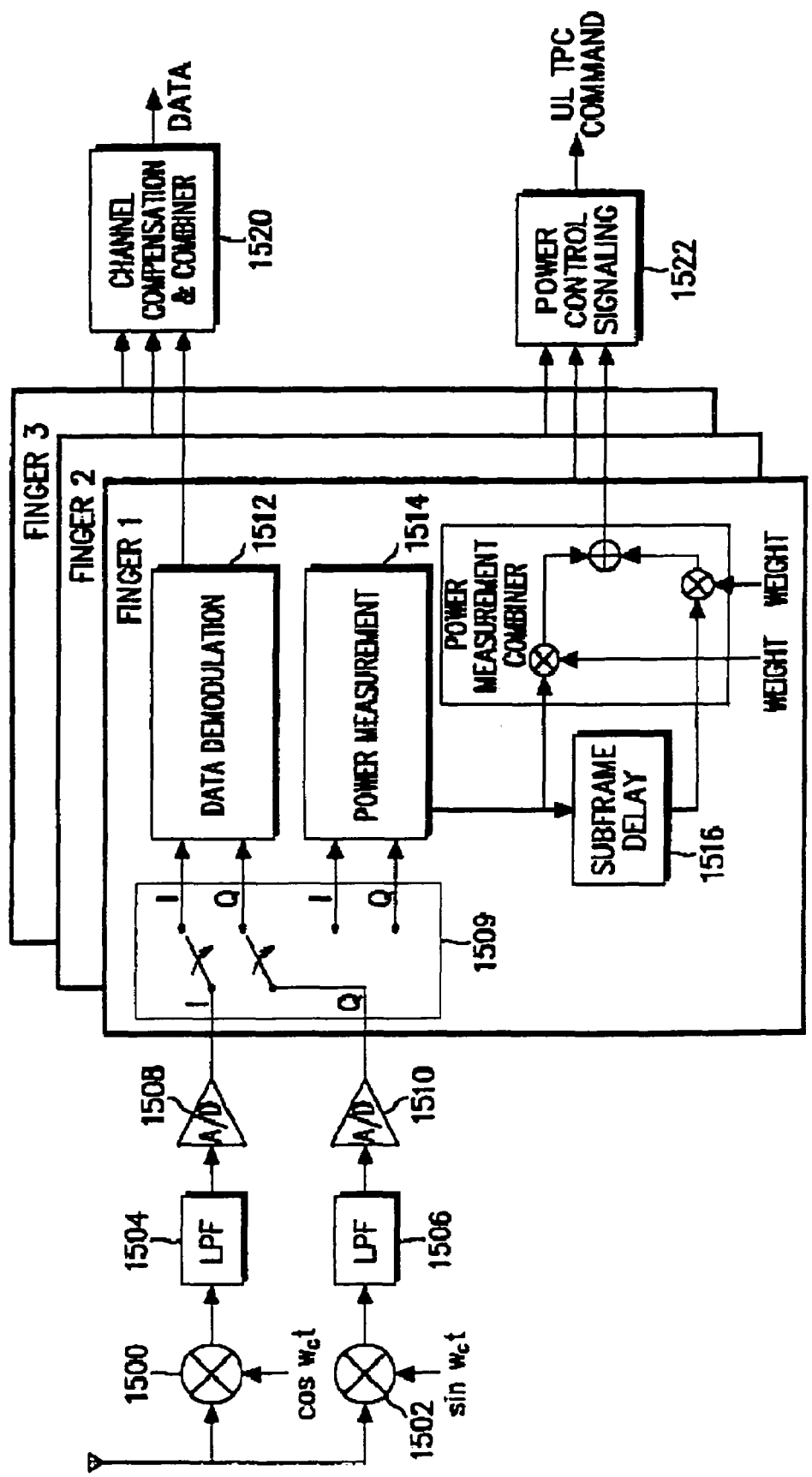
FIG. 18 illustrates a structure of a receiver to which a power control method according to a second embodiment of the present invention is applied.
Figure 19:
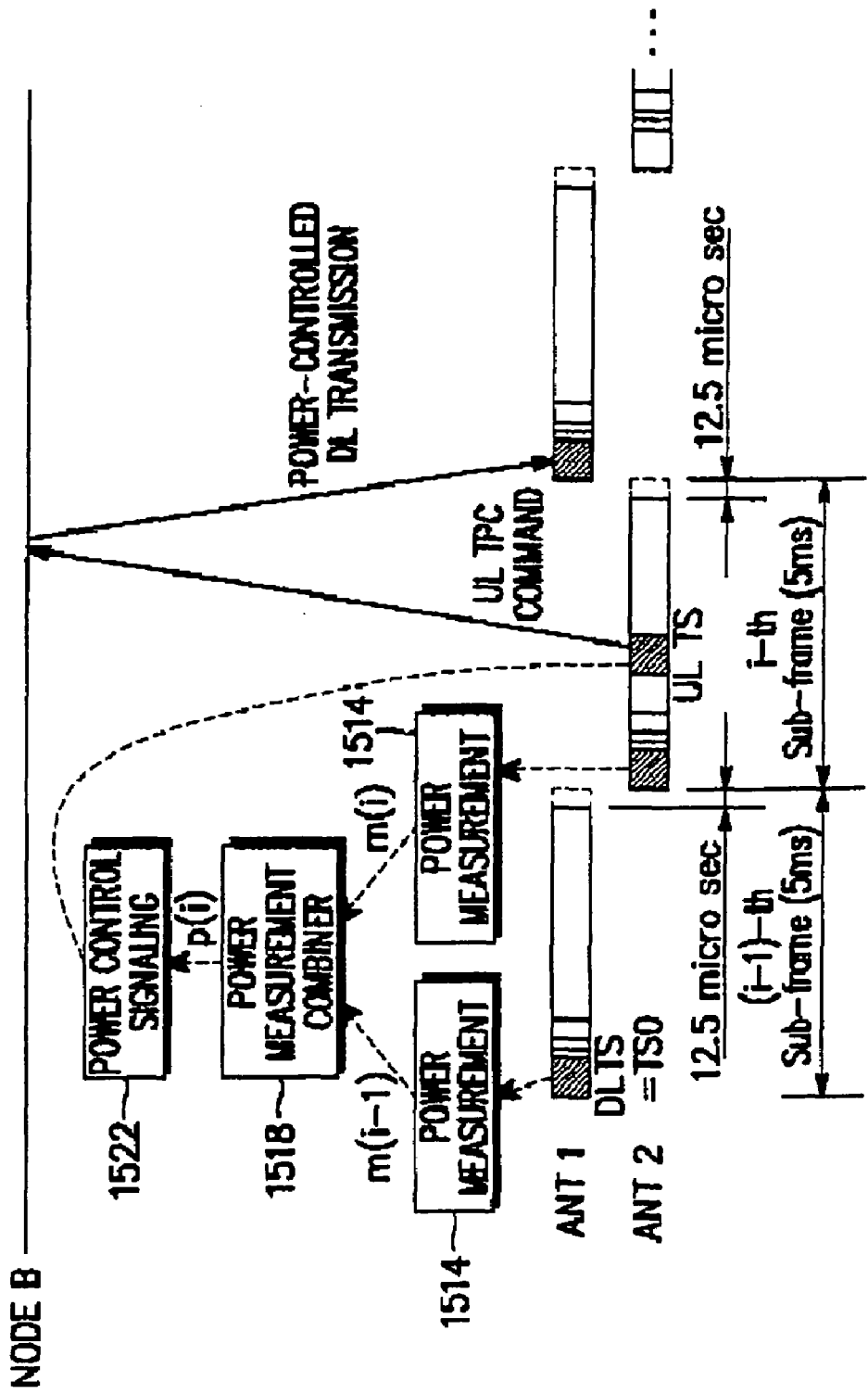
FIG. 19 illustrates a conceptual signal processing flow for the power control method according to the second embodiment of the present invention.
Figure 20:
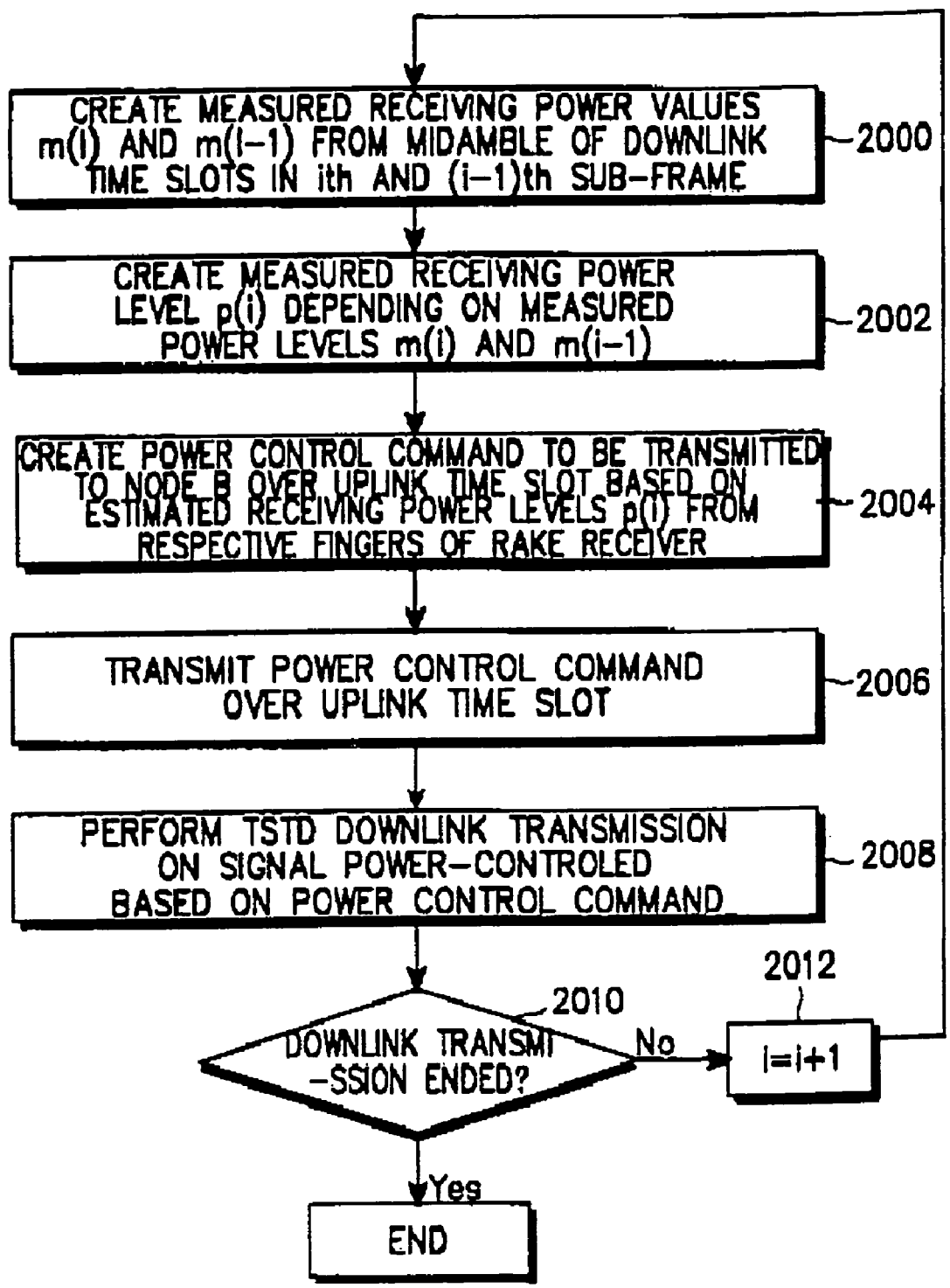
FIG. 20 illustrates a procedure for performing power control according to the second embodiment of the present invention.

FIG. 18 illustrates a structure of a receiver to which a power control method according to a second embodiment of the present invention is applied. The power control method according to the second embodiment of the present invention is also a power control method for an NB-TDD mobile communication system using the TSTD scheme. FIG. 19 illustrates a conceptual signal processing flow for the power control method according to the second embodiment of the present invention. FIG. 20 illustrates a procedure for performing power control according to the second embodiment of the present invention.

A detailed description will be made of the power control method according to the second embodiment of the present invention with reference to FIGS. 18 to 20.

The signals transmitted by the TSTD scheme in the Node B transmitter are received through a single antenna at the UE. Operations of demodulating the signals received through the antenna, converting the demodulated signals to baseband signals and then converting the baseband signals to digital signals are performed in the same manner as done in the first embodiment. In addition, the time demultiplexer 1509 for demultiplexing the digital signals into data and midamble and the structure for outputting final data from the demultiplexed data are identical in structure to those described in the first embodiment. Therefore, a detailed description of the above-state elements will not be provided for simplicity.

The midamble signal demultiplexed by the time demultiplexer 1509 is provided to the power measurer 1514. A procedure for separating the midamble signal from the sub-frame corresponding to the received signal and providing the demultiplexed midamble signal to the power measurer 1514 is illustrated in FIG. 19. For example, FIG. 19 shows an exemplary method for separating the midamble from the time slot Ts0 among the downlink time slots. However, it is obvious to those skilled in the art that the accessing downlink time slot can be varied according to the UE. Upon receiving the midamble, the power measurer 1514 outputs a measured power level m(i) of the received signal at every $i^{th}$ sub-frame depending on the received midamble. Here, the $i^{th}$ sub-frame refers to the currently received sub-frame. The measured power level m(i) is provided to a power measurement combiner 1518 and a sub-frame delay 1516. The sub-frame delay 1516 outputs a previously measured power level m(i−1) provided from the power measurer 1514 before the currently measured power level m(i) is provided. The previously measured power level m(i−1) provided from the sub-frame delay 1516 is provided to the power measurement combiner 1518. A conceptual signal processing flow for creating a measured power level based on a midamble of the current sub-frame and a midamble of the previous sub-frame is illustrated in FIG. 19. Although FIG. 19 shows that the midambles are simultaneously provided from the current sub-frame and the previous sub-frame, it should be construed that the previously measured power level has been delayed by the sub-frame delay 1516. A procedure for providing the measured power level m(i) of the current-subframe and the measured power level m(i−1) of the previous sub-frame to the power measurement combiner 1518 is performed in step 2000 of FIG. 20.

For power control on a sub-frame unit basis, an estimated receiving power level p(i) is calculated by the power measurement combiner 1518 depending on the measured power level m(i) of the current sub-frame and the measured power level m(i−1) of the previous sub-frame. The measured power level m(i−1) of the previous sub-frame, as stated above, is provide from the sub-frame delay 1516. A process for calculating the estimated receiving power level p(i) by the power measurement combiner 1518 for the power control on a sub-frame unit basis is represented by, $$p(i)=w_0 \times m(i)+w_1 \times m(i-1) \qquad (1)$$

In Equation (1), weights $w_0$ and $w_1$ are parameters on which performance of the novel power control method depends, and the sum of the two parameters is $w_0+w_1=1$. The parameters must be determined such that the power control should be optimally performed.

Since the power measurer 1514 is included in the respective fingers constituting the Rake receiver, the Rake receiver will output the estimated receiving power levels p(i), the number of which is equal to the number of the fingers. A procedure for providing the estimated receiving power level p(i) to a power control signaling part 1522 is represented by a dotted line in FIG. 19. An operation of providing the estimated receiving power level p(i) from the power measurement combiner 1518 to the power control signaling part 1522 is performed in step 2002 of FIG. 20.

The estimated receiving power levels p(i) output from the respective fingers of the Rake receiver based on Equation (1) are provided to the power control signaling part 1522, which creates a power control command based on the estimated receiving power levels p(i). An operation of creating the power control command depending on the estimated receiving power levels p(i) by the power control signaling part 1522 is performed in step 2004 of FIG. 20.

FIG. 21 illustrates a structure of the power control signaling part 1522. The estimated receiving power levels m(i) output from the respective fingers of the Rake receiver are added by the adder, and then, provided to the subtracter. The subtracter subtracts a threshold value determined by outer loop power control from the resulting value of the adder. The resulting value from the subtracter is compared with '0' by the comparator. As a result of the comparison, if the resulting value from the subtracter is larger than '0', the power control signaling part 1522 outputs a power-down command (i.e., a bit '0') to decrease downlink transmission power. If, however, the resulting value from the subtracter is smaller than '0', the power control signaling part 1522 outputs a power-up command (i.e., a bit '1') to increase the downlink transmission power.

The power control command created by the power control signaling part 1522 is transmitted along with an uplink time slot to be assigned to itself among the uplink time slots of the sub-frame to be first and foremost transmitted to the Node B. A procedure for transmitting the power control command created by the power control signaling part 1522 along with a predetermined time slot is shown in step 2006 of FIG. 20. The predetermined time slot is an uplink time slot assigned to itself, among a plurality of the uplink time slots constituting the sub-frame.

Upon receiving the power control command from the UE over the predetermined time slot, the Node B performs power control on the sub-frame to be transmitted next depending on the received power control command, in step 2008 of FIG. 20.

After receiving the power-controlled sub-frame from the Node B, the UE receiver determines in step 2010 of FIG. 20 whether downlink transmission from the Node B is completed, i.e., determines whether there is no more frame to be transmitted from the Node B. If it is determined that there is a frame to be transmitted next from the Node B, the UE receiver increases i by one to perform power control on the next sub-frame in step 2012, and then, returns to the step 2000 to repeat the above-stated operation. However, if it is determined that there is no more frame to be transmitted from the Node B, the UE receiver ends the operation.

Table 1 shows required $E_c/I_{or}$ calculated through experiments to which combinations of the weights $w_0$ and $w_1$ used in the power measurement combiner 1518 are applied.

TABLE 1

| $w_0$ | $w_1$ | Required $E_c/I_{or}$ [dB] |
|---|---|---|
| 1 | 0 | −11.8 |
| 2/3 | 1/3 | −12.9 |
| 1/2 | 1/2 | −13.1 |
| 1/3 | 2/3 | −13.6 |
| 0 | 1 | −13.2 |

In Table 1, the first row where $w_0=1$ and $w_1=0$ corresponds to the TSTD scheme to which the power control method for the existing single-antenna transmitter is applied. It is noted from Table 1 that the required $E_c/I_{or}$ is lowest when $w_0=1/3$ and $w_1=2/3$. It is also noted from Table 1 that the power control method for the novel TSTD scheme proposed by the invention is efficient and it is possible to obtain optimal power control performance by properly adjusting the weights.

Figure 22:
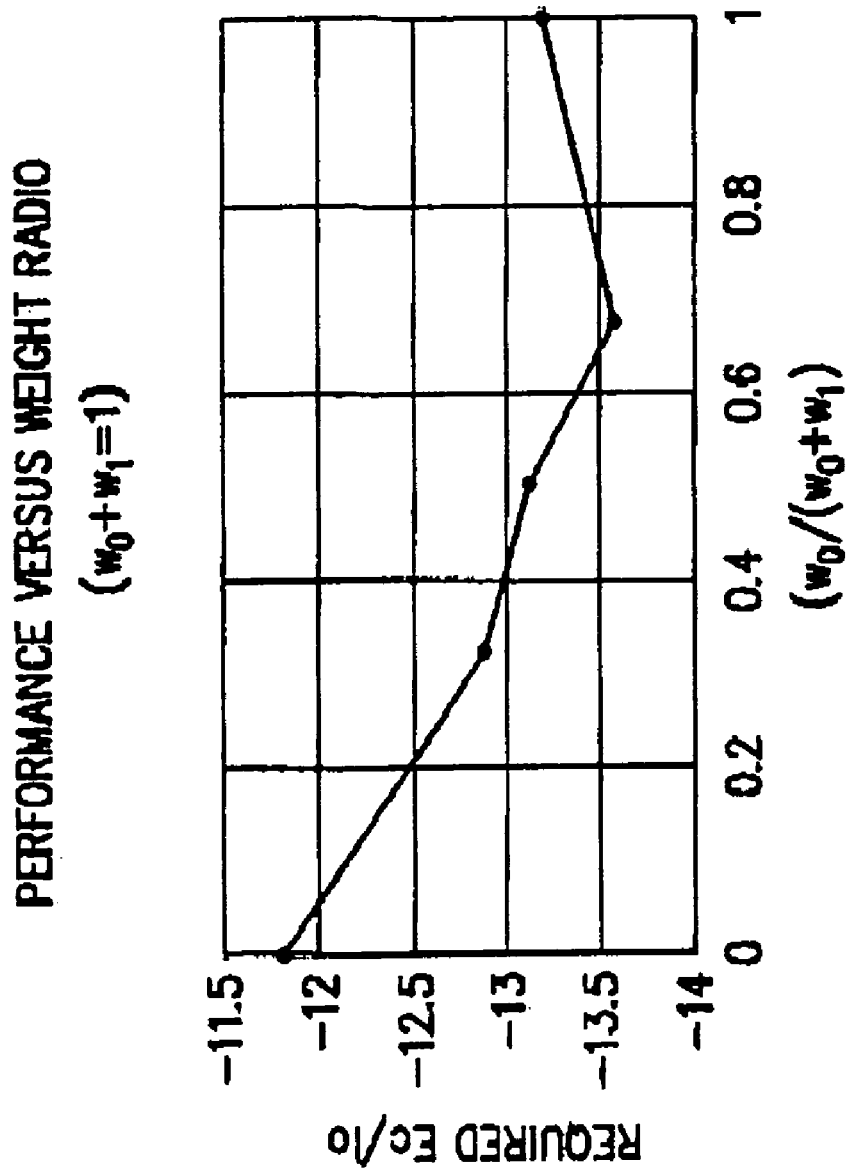
FIG. 22 is a graph illustrating simulation results of the power control method according to an embodiment of the present invention.

Table 1 can be seen by FIG. 22 in the form of graph. That is, FIG. 22 is a graph illustrating performance of the TSTD scheme according to the weights.

Figure 23:
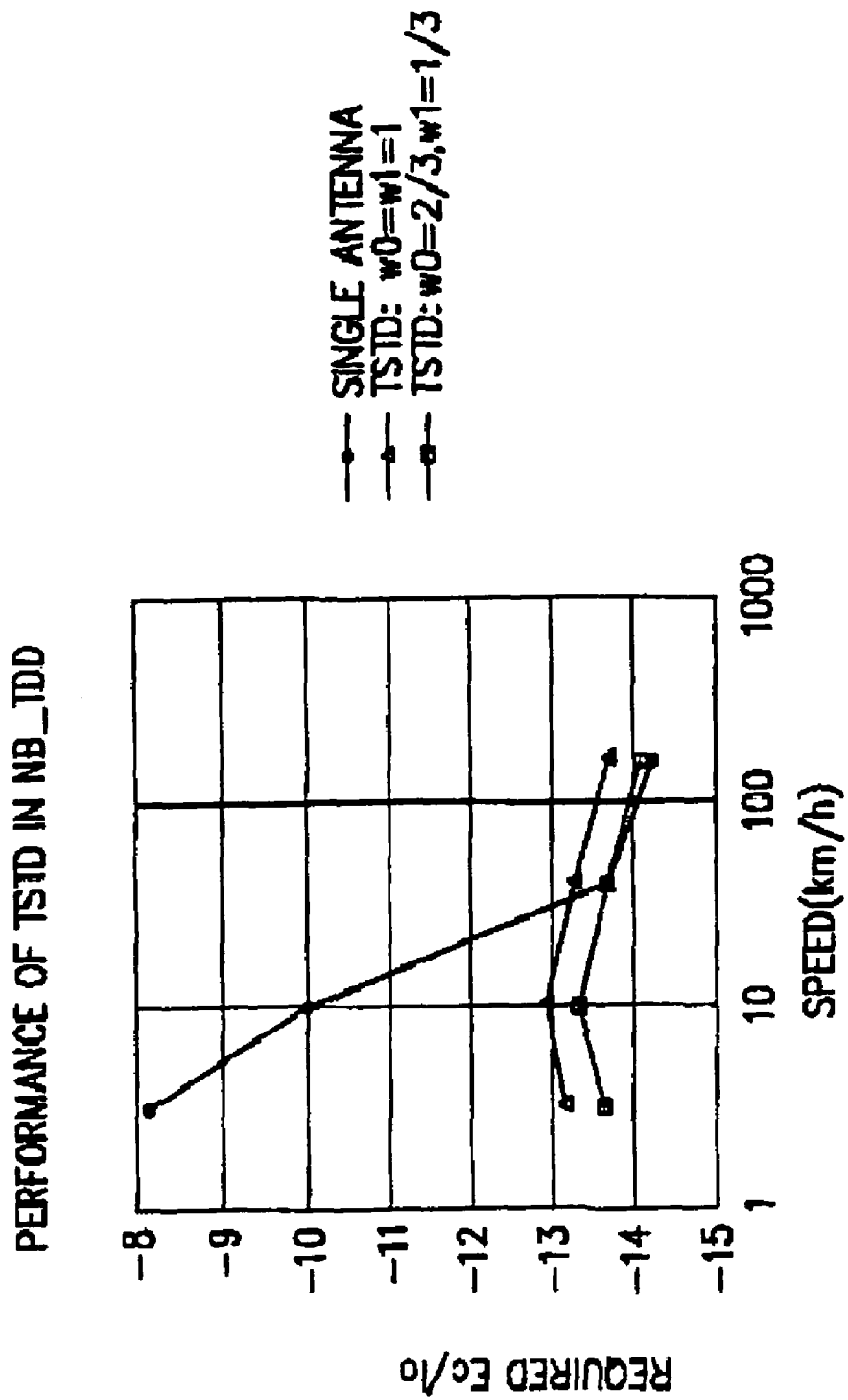
FIG. 23 is a graph illustrating performance comparison between an embodiment of the present invention and the prior art.

FIG. 23 is a graph illustrating power control performance when the power control method according to the present invention is applied to the system where the Node B uses the TSTD scheme, compared with when the existing power control method is applied to the system where the Node B uses the single antenna. In FIG. 23, the x-axis indicates a speed of the UE and the y-axis indicates the required $E_c/I_{or}$. It is noted from FIG. 23 that the TSTD scheme and the power control apparatus shown in FIGS. 15 and 18 provide better performance, as compared with the single-antenna transmitter and the existing power control method. In addition, it is noted from FIG. 13 that compared with the case of $w_0=1/2$ and $w_1=1/2$, the case of $w_0=1/3$ and $w_1=2/3$ shows better performance in every speed region.

In the novel TSTD scheme proposed by the invention, the transmitter separately requires only one additional antenna and one additional switch, compared with when the diversity is not used. In particular, the novel TSTD scheme alternately transmits signals with a single power amplifier using two antennas, so that it is not necessary to additionally use a relatively expensive power amplifier, thus contributing to a reduction in the cost of the Node B. In light of the simplicity of the transmitter, the TSTD scheme can be applied to the UE as well as the Node B. In addition, it is not necessary to modify a structure of the receiver in receiving the signals transmitted using the novel TSTD scheme.

In general, unlike the closed-loop antenna diversity scheme, the TSTD scheme has a lower bit error rate even in the worst channel environment, compared with the single-antenna scheme. Since the novel method according to the present invention can be easily implemented using the frame structure for the W-TDD or NB-TDD mobile communication system, it is possible to increase the downlink capacity even in the low-cost Node B where it is difficult to install a smart antenna, i.e. an antenna array applied to telecommunications. The Node B using the smart antenna for transmission of the dedicated channel can use the TSTD scheme for transmission of the shared physical channel, and can also utilize antenna elements of an antenna array in the smart antenna for the TSTD transmission.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A power control apparatus in a UE (User Equipment) for an NB-TDD (Narrow Band Time Division Multiplexing) CDMA mobile communication system, wherein transmission frames each have two sub-frames, and each of the sub-frames has uplink time slots and downlink time slots, each including two data parts having the same length, a midamble intervening between the data parts, the power control apparatus performing power control by receiving a radio signal having a sub-frame structure through a single antenna, the power control apparatus comprising:

a plurality of fingers, each including:
    a time demultiplexer for separating a midamble signal from the radio signal having the sub-frame structure;
    a power measurer for measuring a power level depending on the midamble signal on a sub-frame unit basis and outputting a measured power level; and
a power control signaling part for receiving measured power levels output from the plurality of fingers, and creating based on the measured power levels a power control command to be transmitted to a Node B over an uplink time slot assigned to itself among uplink time slots of the sub-frame.

2. The power control apparatus as claimed in claim 1, wherein the fingers each comprise:
   a sub-frame delay for delaying the measured power level from the power measurer for a time period corresponding to a length of one sub-frame; and
   a power measurement combiner for receiving the measured power level from the power measurer and the delayed measured power level from the sub-frame delay, and creating a measured final power level depending on the two measured power levels and a predetermined weight.

3. The power control apparatus as claimed in claim 1, wherein the power control signaling part comprises:
   an adder for adding the measured power levels output from the respective fingers;
   a subtracter for subtracting a predetermined threshold value from the added measured power level; and
   a comparator for comparing a resulting value of the subtracter with '0', and creating the power control command according to the compared results.

4. The power control apparatus as claimed in claim 3, wherein the comparator creates a power-down command requesting a decrease in downlink transmission power if the resulting value of the subtracter is larger than '0', and creates a power-up command requesting an increase in the downlink transmission power if the resulting value is smaller than '0'.

5. A power control method in a UE (User Equipment) for an NB-TDD (Narrow Band Time Division Multiplexing) CDMA (Code Division Multiple Access) mobile communication system, wherein transmission frames each have two sub-frames, and each of the sub-frames has uplink time slots and downlink time slots, each including two data parts having the same length, a midamble intervening between the data parts, the power control method performing power control by receiving a radio signal having a sub-frame structure through a single antenna, the power control method comprising the steps of:
   separating by each of a plurality of fingers a midamble signal from the radio signal having the sub-frame structure, measuring a power level depending on the midamble signal on a sub-frame unit basis and outputting a measured power level; and
   receiving, by a power control signaling part, measured power levels output from the fingers, and creating based on the measured power levels a power control command to be transmitted to a Node B over an uplink time slot assigned to itself among uplink time slots of the sub-frame.

6. The power control method as claimed in claim 5, wherein the measured power level outputting step comprise the steps of:
   delaying the measured power level for a time period corresponding to a length of one sub-frame; and
   receiving the measured power level and the delayed measured power level, and creating a measured final power level depending on the two measured power levels and a predetermined weight.

7. The power control method as claimed in claim 5, wherein the power control command creating step comprises the steps of:
   adding the measured power levels output from the respective fingers;
   subtracting a predetermined threshold value from the added measured power level; and
   comparing the resulting subtracted value with '0', and creating the power control command according to the compared results.

8. The power control method as claimed in claim 7, further comprising the steps of:
   creating a power-down command requesting a decrease in downlink transmission power if the resulting compared value is larger than '0'; and
   creating a power-up command requesting an increase in the downlink transmission power if the resulting compared value is smaller than '0'.

* * * * *